United States Patent
Lindemann

(10) Patent No.: US 9,898,596 B2
(45) Date of Patent: Feb. 20, 2018

(54) SYSTEM AND METHOD FOR EYE TRACKING DURING AUTHENTICATION

(71) Applicant: NOK NOK LABS, INC., Palo Alto, CA (US)

(72) Inventor: Rolf Lindemann, Steele (DE)

(73) Assignee: Nok Nok Labs, Inc., Palo Alto, CA (US)

( * ) Notice: Subject to any disclaimer, the term of this patent is extended or adjusted under 35 U.S.C. 154(b) by 0 days.

(21) Appl. No.: 14/218,551

(22) Filed: Mar. 18, 2014

(65) Prior Publication Data
US 2014/0289834 A1    Sep. 25, 2014

Related U.S. Application Data

(60) Provisional application No. 61/804,568, filed on Mar. 22, 2013.

(51) Int. Cl.
*G06F 21/32* (2013.01)
*G06Q 20/40* (2012.01)
(Continued)

(52) U.S. Cl.
CPC ............ *G06F 21/32* (2013.01); *G06F 21/577* (2013.01); *G06Q 20/204* (2013.01);
(Continued)

(58) Field of Classification Search
CPC .......................... H04L 63/0861; H04L 63/083
(Continued)

(56) References Cited

U.S. PATENT DOCUMENTS 5,280,527 A    1/1994 Gullman et al.
5,764,789 A    6/1998 Pare, Jr. et al.
(Continued)

FOREIGN PATENT DOCUMENTS

CN    1705925 A    12/2005
CN    101394283 A    3/2009
(Continued)

OTHER PUBLICATIONS

"Analysis of Advertising Effectiveness with Eye Tracking"—Theuner et al, Department of Marketing, Ludwigshafen University, Aug. 2008 http://www.noldus.com/mb2008/individual_papers/FPS_eye_tracking/FPS_eye_tracking_Theuner.pdf.*
(Continued)

*Primary Examiner* — Randy Scott
(74) *Attorney, Agent, or Firm* — Nicholson De Vos Webster & Elliott LLP

(57) ABSTRACT

A system, apparatus, method, and machine readable medium are described for performing eye tracking during authentication. For example, one embodiment of a method comprises: receiving a request to authenticate a user; presenting one or more screen layouts to the user; capturing a sequence of images which include the user's eyes as the one or more screen layouts are displayed; and (a) performing eye movement detection across the sequence of images to identify a correlation between motion of the user's eyes as the one or more screen layouts are presented and an expected motion of the user's eyes as the one or more screen layouts are presented and/or (b) measuring the eye's pupil size to identify a correlation between the effective light intensity of the screen and its effect on the user's eye pupil size.

26 Claims, 8 Drawing Sheets

(51) Int. Cl.
*G06Q 20/42* (2012.01)
*H04L 9/32* (2006.01)
*H04L 29/06* (2006.01)
*H04L 9/08* (2006.01)
*G06F 21/57* (2013.01)
*G07F 19/00* (2006.01)
*G06Q 20/20* (2012.01)
*G06Q 20/32* (2012.01)
*H04W 12/06* (2009.01)

(52) U.S. Cl.
CPC ..... *G06Q 20/3224* (2013.01); *G06Q 20/3274* (2013.01); *G06Q 20/3278* (2013.01); *G06Q 20/4012* (2013.01); *G06Q 20/40145* (2013.01); *G06Q 20/42* (2013.01); *G06Q 20/425* (2013.01); *G07F 19/20* (2013.01); *H04L 9/0819* (2013.01); *H04L 9/0822* (2013.01); *H04L 9/0841* (2013.01); *H04L 9/3231* (2013.01); *H04L 9/3247* (2013.01); *H04L 9/3297* (2013.01); *H04L 63/0492* (2013.01); *H04L 63/08* (2013.01); *H04L 63/083* (2013.01); *H04L 63/0861* (2013.01); *H04L 63/20* (2013.01); *G06F 2221/2115* (2013.01); *H04L 2209/805* (2013.01); *H04L 2463/102* (2013.01); *H04W 12/06* (2013.01)

(58) Field of Classification Search
USPC .............. 726/5, 2, 7, 12; 713/185, 186, 188
See application file for complete search history.

(56) References Cited

U.S. PATENT DOCUMENTS

| | | | |
|---|---|---|---|
| 6,088,450 A | 7/2000 | Davis et al. | |
| 6,178,511 B1 | 1/2001 | Cohen et al. | |
| 6,377,691 B1 | 4/2002 | Swift et al. | |
| 6,618,806 B1 | 9/2003 | Brown et al. | |
| 6,751,733 B1 | 6/2004 | Nakamura et al. | |
| 6,842,896 B1 | 1/2005 | Redding et al. | |
| 6,938,156 B2 | 8/2005 | Wheeler et al. | |
| 7,155,035 B2 * | 12/2006 | Kondo ............... G07C 9/00158 340/5.52 | |
| 7,194,763 B2 | 3/2007 | Potter et al. | |
| 7,263,717 B1 | 8/2007 | Boydstun et al. | |
| 7,444,368 B1 | 10/2008 | Wong et al. | |
| 7,487,357 B2 | 2/2009 | Smith et al. | |
| 7,512,567 B2 | 3/2009 | Bemmel et al. | |
| 7,698,565 B1 | 4/2010 | Bjorn et al. | |
| 7,865,937 B1 | 1/2011 | White et al. | |
| 7,941,669 B2 | 5/2011 | Foley et al. | |
| 8,060,922 B2 | 11/2011 | Crichton et al. | |
| 8,166,531 B2 | 4/2012 | Suzuki | |
| 8,245,030 B2 | 8/2012 | Lin | |
| 8,284,043 B2 | 10/2012 | Judd et al. | |
| 8,291,468 B1 | 10/2012 | Chickering | |
| 8,353,016 B1 | 1/2013 | Pravetz et al. | |
| 8,359,045 B1 | 1/2013 | Hopkins, III | |
| 8,458,465 B1 | 6/2013 | Stern et al. | |
| 8,489,506 B2 | 7/2013 | Hammad et al. | |
| 8,516,552 B2 | 8/2013 | Raleigh | |
| 8,555,340 B2 | 10/2013 | Potter et al. | |
| 8,561,152 B2 | 10/2013 | Novak et al. | |
| 8,584,224 B1 | 11/2013 | Pei et al. | |
| 8,607,048 B2 | 12/2013 | Nogawa | |
| 8,646,060 B1 | 2/2014 | Ben | |
| 8,713,325 B2 | 4/2014 | Ganesan | |
| 8,719,905 B2 | 5/2014 | Ganesan | |
| 8,776,180 B2 | 7/2014 | Kumar et al. | |
| 8,856,541 B1 * | 10/2014 | Chaudhury et al. ........... 713/186 | |
| 8,949,978 B1 | 2/2015 | Lin et al. | |
| 8,958,599 B1 * | 2/2015 | Starner ............... G06K 9/00604 382/103 | |
| 8,978,117 B2 | 3/2015 | Bentley et al. | |
| 9,015,482 B2 | 4/2015 | Baghdasaryan et al. | |
| 9,032,485 B2 | 5/2015 | Chu et al. | |
| 9,083,689 B2 | 7/2015 | Lindemann et al. | |
| 9,161,209 B1 | 10/2015 | Ghoshal et al. | |
| 9,171,306 B1 | 10/2015 | He et al. | |
| 9,172,687 B2 | 10/2015 | Baghdasaryan et al. | |
| 9,396,320 B2 | 7/2016 | Lindemann | |
| 2001/0037451 A1 | 11/2001 | Bhagavatula et al. | |
| 2002/0010857 A1 | 1/2002 | Karthik | |
| 2002/0016913 A1 | 2/2002 | Wheeler et al. | |
| 2002/0040344 A1 | 4/2002 | Preiser et al. | |
| 2002/0073316 A1 | 6/2002 | Collins et al. | |
| 2002/0073320 A1 | 6/2002 | Rinkevich et al. | |
| 2002/0087894 A1 | 7/2002 | Foley et al. | |
| 2002/0112170 A1 | 8/2002 | Foley et al. | |
| 2002/0174344 A1 | 11/2002 | Ting | |
| 2002/0174348 A1 | 11/2002 | Ting | |
| 2003/0055792 A1 | 3/2003 | Kinoshita et al. | |
| 2003/0065805 A1 | 4/2003 | Barnes | |
| 2003/0084300 A1 | 5/2003 | Koike | |
| 2003/0087629 A1 | 5/2003 | Juitt et al. | |
| 2003/0115142 A1 | 6/2003 | Brickell et al. | |
| 2003/0135740 A1 | 7/2003 | Talmor et al. | |
| 2003/0152252 A1 * | 8/2003 | Kondo ............... G07C 9/00158 382/117 | |
| 2003/0226036 A1 | 12/2003 | Bivens et al. | |
| 2003/0236991 A1 | 12/2003 | Letsinger | |
| 2004/0101170 A1 * | 5/2004 | Tisse ............... G06K 9/00597 382/117 | |
| 2004/0123153 A1 | 6/2004 | Wright et al. | |
| 2005/0021964 A1 | 1/2005 | Bhatnagar et al. | |
| 2005/0080716 A1 | 4/2005 | Belyi et al. | |
| 2005/0097320 A1 | 5/2005 | Golan et al. | |
| 2005/0125295 A1 | 6/2005 | Tidwell et al. | |
| 2005/0160052 A1 | 7/2005 | Schneider et al. | |
| 2005/0187883 A1 | 8/2005 | Bishop et al. | |
| 2005/0223236 A1 | 10/2005 | Yamada et al. | |
| 2005/0278253 A1 | 12/2005 | Meek et al. | |
| 2006/0026671 A1 | 2/2006 | Potter et al. | |
| 2006/0029062 A1 | 2/2006 | Rao et al. | |
| 2006/0156385 A1 | 7/2006 | Chiviendacz et al. | |
| 2006/0161435 A1 | 7/2006 | Atef et al. | |
| 2006/0161672 A1 | 7/2006 | Jolley et al. | |
| 2006/0282670 A1 | 12/2006 | Karchov | |
| 2007/0005988 A1 | 1/2007 | Zhang et al. | |
| 2007/0077915 A1 | 4/2007 | Black et al. | |
| 2007/0088950 A1 * | 4/2007 | Wheeler ............... G06Q 20/00 713/170 | |
| 2007/0100756 A1 | 5/2007 | Varma | |
| 2007/0106895 A1 | 5/2007 | Huang et al. | |
| 2007/0107048 A1 | 5/2007 | Halls et al. | |
| 2007/0118883 A1 | 5/2007 | Potter et al. | |
| 2007/0165625 A1 | 7/2007 | Eisner et al. | |
| 2007/0168677 A1 | 7/2007 | Kudo | |
| 2007/0169182 A1 | 7/2007 | Wolfond et al. | |
| 2007/0198435 A1 | 8/2007 | Siegal et al. | |
| 2007/0239980 A1 | 10/2007 | Funayama | |
| 2007/0278291 A1 | 12/2007 | Rans et al. | |
| 2007/0286130 A1 | 12/2007 | Shao et al. | |
| 2008/0005562 A1 | 1/2008 | Sather et al. | |
| 2008/0025234 A1 | 1/2008 | Zhu et al. | |
| 2008/0028453 A1 | 1/2008 | Nguyen et al. | |
| 2008/0034207 A1 | 2/2008 | Cam-Winget et al. | |
| 2008/0046334 A1 | 2/2008 | Lee et al. | |
| 2008/0046984 A1 | 2/2008 | Bohmer et al. | |
| 2008/0049983 A1 | 2/2008 | Miller et al. | |
| 2008/0086759 A1 | 4/2008 | Colson | |
| 2008/0134311 A1 | 6/2008 | Medvinsky et al. | |
| 2008/0141339 A1 | 6/2008 | Gomez et al. | |
| 2008/0172725 A1 | 7/2008 | Fujii et al. | |
| 2008/0209545 A1 | 8/2008 | Asano | |
| 2008/0232565 A1 | 9/2008 | Kutt et al. | |
| 2008/0235801 A1 | 9/2008 | Soderberg et al. | |
| 2008/0271150 A1 | 10/2008 | Boerger et al. | |
| 2008/0289019 A1 | 11/2008 | Lam | |
| 2008/0289020 A1 | 11/2008 | Cameron et al. | |
| 2008/0313719 A1 | 12/2008 | Kaliski, Jr. et al. | |
| 2008/0320308 A1 | 12/2008 | Kostiainen et al. | |

(56) References Cited

U.S. PATENT DOCUMENTS

| | | |
|---|---|---|
| 2009/0049510 A1 | 2/2009 | Zhang et al. |
| 2009/0064292 A1 | 3/2009 | Carter et al. |
| 2009/0089870 A1 | 4/2009 | Wahl |
| 2009/0100269 A1 | 4/2009 | Naccache |
| 2009/0116651 A1 | 5/2009 | Liang et al. |
| 2009/0133113 A1 | 5/2009 | Schneider |
| 2009/0138724 A1 | 5/2009 | Chiou et al. |
| 2009/0138727 A1 | 5/2009 | Campello |
| 2009/0158425 A1* | 6/2009 | Chan ..................... G06F 21/60 726/21 |
| 2009/0183003 A1 | 7/2009 | Haverinen |
| 2009/0187988 A1 | 7/2009 | Hulten et al. |
| 2009/0193508 A1 | 7/2009 | Brenneman et al. |
| 2009/0196418 A1 | 8/2009 | Tkacik et al. |
| 2009/0199264 A1 | 8/2009 | Lang |
| 2009/0204964 A1 | 8/2009 | Foley et al. |
| 2009/0235339 A1 | 9/2009 | Mennes et al. |
| 2009/0271618 A1 | 10/2009 | Camenisch et al. |
| 2009/0271635 A1 | 10/2009 | Liu et al. |
| 2009/0300714 A1 | 12/2009 | Ahn |
| 2009/0300720 A1 | 12/2009 | Guo et al. |
| 2009/0307139 A1 | 12/2009 | Mardikar et al. |
| 2009/0327131 A1 | 12/2009 | Beenau et al. |
| 2009/0328197 A1 | 12/2009 | Newell et al. |
| 2010/0010932 A1 | 1/2010 | Law et al. |
| 2010/0023454 A1 | 1/2010 | Exton et al. |
| 2010/0029300 A1 | 2/2010 | Chen |
| 2010/0042848 A1 | 2/2010 | Rosener |
| 2010/0062744 A1 | 3/2010 | Ibrahim |
| 2010/0070424 A1 | 3/2010 | Monk |
| 2010/0082484 A1 | 4/2010 | Erhart et al. |
| 2010/0083000 A1 | 4/2010 | Kesanupalli |
| 2010/0094681 A1* | 4/2010 | Almen ..................... G06F 3/013 705/7.29 |
| 2010/0105427 A1 | 4/2010 | Gupta |
| 2010/0107222 A1 | 4/2010 | Glasser |
| 2010/0114776 A1 | 5/2010 | Weller et al. |
| 2010/0169650 A1 | 7/2010 | Brickell et al. |
| 2010/0175116 A1 | 7/2010 | Gum |
| 2010/0186072 A1* | 7/2010 | Kumar ..................... G06Q 10/10 726/7 |
| 2010/0192209 A1 | 7/2010 | Steeves et al. |
| 2010/0223663 A1 | 9/2010 | Morimoto et al. |
| 2010/0242088 A1 | 9/2010 | Thomas |
| 2010/0287369 A1 | 11/2010 | Monden |
| 2010/0325427 A1 | 12/2010 | Ekberg et al. |
| 2010/0325664 A1 | 12/2010 | Kang |
| 2010/0325684 A1* | 12/2010 | Grebenik ............... G06F 21/604 726/1 |
| 2010/0325711 A1 | 12/2010 | Etchegoyen |
| 2011/0004933 A1 | 1/2011 | Dickinson et al. |
| 2011/0022835 A1 | 1/2011 | Schibuk |
| 2011/0047608 A1 | 2/2011 | Levenberg |
| 2011/0071841 A1 | 3/2011 | Fomenko et al. |
| 2011/0078443 A1 | 3/2011 | Greenstein et al. |
| 2011/0082801 A1 | 4/2011 | Baghdasaryan et al. |
| 2011/0083016 A1 | 4/2011 | Kesanupalli et al. |
| 2011/0093942 A1 | 4/2011 | Koster et al. |
| 2011/0107087 A1 | 5/2011 | Lee et al. |
| 2011/0138450 A1 | 6/2011 | Kesanupalli et al. |
| 2011/0157346 A1 | 6/2011 | Zyzdryn et al. |
| 2011/0167154 A1 | 7/2011 | Bush et al. |
| 2011/0167472 A1 | 7/2011 | Evans et al. |
| 2011/0191200 A1 | 8/2011 | Bayer et al. |
| 2011/0197267 A1 | 8/2011 | Gravel et al. |
| 2011/0219427 A1 | 9/2011 | Hito et al. |
| 2011/0225431 A1 | 9/2011 | Stufflebeam, Jr. et al. |
| 2011/0228330 A1 | 9/2011 | Nogawa |
| 2011/0231911 A1 | 9/2011 | White et al. |
| 2011/0246766 A1 | 10/2011 | Orsini et al. |
| 2011/0265159 A1 | 10/2011 | Ronda et al. |
| 2011/0279228 A1 | 11/2011 | Kumar |
| 2011/0280402 A1 | 11/2011 | Ibrahim et al. |
| 2011/0296518 A1 | 12/2011 | Faynberg et al. |
| 2011/0307706 A1 | 12/2011 | Fielder |
| 2011/0307949 A1 | 12/2011 | Ronda et al. |
| 2011/0313872 A1 | 12/2011 | Carter et al. |
| 2011/0314549 A1 | 12/2011 | Song et al. |
| 2011/0320823 A1 | 12/2011 | Saroiu et al. |
| 2012/0018506 A1 | 1/2012 | Hammad et al. |
| 2012/0023568 A1 | 1/2012 | Cha et al. |
| 2012/0046012 A1 | 2/2012 | Forutanpour et al. |
| 2012/0075062 A1 | 3/2012 | Osman et al. |
| 2012/0084566 A1 | 4/2012 | Chin et al. |
| 2012/0102553 A1 | 4/2012 | Hsueh et al. |
| 2012/0124639 A1 | 5/2012 | Shaikh et al. |
| 2012/0124651 A1 | 5/2012 | Ganesan et al. |
| 2012/0144461 A1 | 6/2012 | Rathbun |
| 2012/0159577 A1 | 6/2012 | Belinkiy et al. |
| 2012/0191979 A1 | 7/2012 | Feldbau |
| 2012/0203906 A1 | 8/2012 | Jaudon et al. |
| 2012/0204032 A1 | 8/2012 | Wilkins et al. |
| 2012/0210135 A1 | 8/2012 | Panchapakesan et al. |
| 2012/0249298 A1 | 10/2012 | Sovio et al. |
| 2012/0272056 A1 | 10/2012 | Ganesan |
| 2012/0278873 A1 | 11/2012 | Calero et al. |
| 2012/0291114 A1 | 11/2012 | Poliashenko et al. |
| 2012/0313746 A1* | 12/2012 | Rahman et al. ................. 340/5.1 |
| 2012/0317297 A1 | 12/2012 | Bailey |
| 2013/0042327 A1 | 2/2013 | Chow |
| 2013/0046976 A1 | 2/2013 | Rosati et al. |
| 2013/0046991 A1 | 2/2013 | Lu et al. |
| 2013/0054967 A1 | 2/2013 | Davoust et al. |
| 2013/0061055 A1 | 3/2013 | Schibuk |
| 2013/0067546 A1 | 3/2013 | Thavasi et al. |
| 2013/0073859 A1 | 3/2013 | Carlson et al. |
| 2013/0086669 A1 | 4/2013 | Sondhi et al. |
| 2013/0097682 A1 | 4/2013 | Zeljkovic et al. |
| 2013/0104187 A1 | 4/2013 | Weidner |
| 2013/0104190 A1 | 4/2013 | Simske et al. |
| 2013/0119130 A1 | 5/2013 | Braams |
| 2013/0124285 A1 | 5/2013 | Pravetz et al. |
| 2013/0124422 A1 | 5/2013 | Hubert et al. |
| 2013/0125197 A1 | 5/2013 | Pravetz et al. |
| 2013/0125222 A1 | 5/2013 | Pravetz et al. |
| 2013/0133049 A1 | 5/2013 | Peirce |
| 2013/0133054 A1 | 5/2013 | Davis et al. |
| 2013/0144785 A1 | 6/2013 | Karpenko et al. |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0167196 A1 | 6/2013 | Spencer et al. |
| 2013/0219456 A1 | 8/2013 | Sharma et al. |
| 2013/0227646 A1 | 8/2013 | Haggerty et al. |
| 2013/0239173 A1 | 9/2013 | Dispensa |
| 2013/0282589 A1 | 10/2013 | Shoup et al. |
| 2013/0308778 A1 | 11/2013 | Fosmark et al. |
| 2013/0318343 A1 | 11/2013 | Bjarnason et al. |
| 2013/0337777 A1 | 12/2013 | Deutsch et al. |
| 2013/0346176 A1 | 12/2013 | Alolabi et al. |
| 2014/0002238 A1 | 1/2014 | Taveau et al. |
| 2014/0007215 A1 | 1/2014 | Romano et al. |
| 2014/0013422 A1 | 1/2014 | Janus et al. |
| 2014/0033271 A1 | 1/2014 | Barton et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez et al. |
| 2014/0075516 A1 | 3/2014 | Chermside |
| 2014/0089243 A1 | 3/2014 | Oppenheimer |
| 2014/0096182 A1 | 4/2014 | Smith |
| 2014/0101439 A1 | 4/2014 | Pettigrew et al. |
| 2014/0109174 A1 | 4/2014 | Barton et al. |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan et al. |
| 2014/0189360 A1 | 7/2014 | Baghdasaryan et al. |
| 2014/0189779 A1 | 7/2014 | Baghdasaryan et al. |
| 2014/0189791 A1 | 7/2014 | Lindemann et al. |

(56) References Cited

U.S. PATENT DOCUMENTS

| | | | |
|---|---|---|---|
| 2014/0189807 | A1 | 7/2014 | Cahill et al. |
| 2014/0189808 | A1 | 7/2014 | Mahaffey et al. |
| 2014/0189828 | A1 | 7/2014 | Baghdasaryan et al. |
| 2014/0189835 | A1 | 7/2014 | Umerley |
| 2014/0201809 | A1 | 7/2014 | Choyi et al. |
| 2014/0230032 | A1 | 8/2014 | Duncan |
| 2014/0245391 | A1 | 8/2014 | Adenuga |
| 2014/0250523 | A1 | 9/2014 | Savvides et al. |
| 2014/0258125 | A1 | 9/2014 | Gerber et al. |
| 2014/0258711 | A1 | 9/2014 | Brannon |
| 2014/0282868 | A1 | 9/2014 | Sheller et al. |
| 2014/0282945 | A1 | 9/2014 | Smith et al. |
| 2014/0282965 | A1 | 9/2014 | Sambamurthy et al. |
| 2014/0289117 | A1 | 9/2014 | Baghdasaryan |
| 2014/0289820 | A1 | 9/2014 | Lindemann et al. |
| 2014/0289833 | A1 | 9/2014 | Briceno et al. |
| 2014/0298419 | A1 | 10/2014 | Boubez et al. |
| 2014/0304505 | A1 | 10/2014 | Dawson |
| 2015/0046340 | A1 | 2/2015 | Dimmick |
| 2015/0058931 | A1 | 2/2015 | Miu et al. |
| 2015/0095999 | A1 | 4/2015 | Toth et al. |
| 2015/0134330 | A1 | 5/2015 | Baldwin et al. |
| 2015/0142628 | A1 | 5/2015 | Suplee et al. |
| 2015/0180869 | A1 | 6/2015 | Verma |
| 2015/0244696 | A1 | 8/2015 | Ma |
| 2015/0269050 | A1 | 9/2015 | Filimonov et al. |
| 2015/0326529 | A1 | 11/2015 | Morita |
| 2015/0381580 | A1 | 12/2015 | Graham, III et al. |
| 2016/0036588 | A1 | 2/2016 | Thackston |
| 2016/0072787 | A1 | 3/2016 | Balabine et al. |
| 2016/0078869 | A1 | 3/2016 | Syrdal et al. |
| 2016/0087952 | A1 | 3/2016 | Tartz et al. |
| 2016/0087957 | A1 | 3/2016 | Shah et al. |
| 2016/0188958 | A1 | 6/2016 | Martin |
| 2017/0004487 | A1 | 1/2017 | Hagen et al. |
| 2017/0109751 | A1 | 4/2017 | Dunkelberger et al. |

FOREIGN PATENT DOCUMENTS

| | | |
|---|---|---|
| CN | 102763111 A | 10/2012 |
| WO | 2005003985 A1 | 1/2005 |
| WO | 2013082190 A1 | 6/2013 |
| WO | 2014105994 A2 | 7/2014 |
| WO | 2015130734 A1 | 9/2015 |

OTHER PUBLICATIONS

Anthony J. Nicholson, "Mobile Device Security Using Transient Authentication," IEEE Transactions on Mobile Computing vol. 5, No. 11, pp. 1489-1502 (Nov. 2006).

Mohammad O. Derawi, "Unobtrusive User-Authentication on Mobile Phones using Biometric Gait Recognition" (2010) 6 pages.

Koichiro Niinuma, Anil K. Jain, "Continuous User Authentication Using Temporal Information" (currently at http://www.cse.msu.edu/biometrics/Publications/Face/NiinumaJain_ContinuousAuth_SPIE10.pdf). 11 pages.

BehavioSec, "Measuring FAR/FRR/EER in Continuous Authentication," Stockholm, Sweden (2009). 8 pages.

The Online Certificate Status Protocol (OCSP, RFC2560), 22 pages, Jun. 1999.

See current WikiPedia article for "Eye Tracking" at en.wikipedia.org/wiki/Eye_tracking.

(see Hartzell, "Crazy Egg Heatmap Shows Where People Click on Your Website" (Nov. 30, 2012), currently at www.michaelhartzell.com/Blog/bid/92970/Crazy-Egg-Heatmap-shows-where-people-click-on-your-website). 3 pages.

Notification of Transmittal of the International Search Report and the Written Opinion from counterpart Patent Cooperation Treaty Application No. PCT/US14/31344, mailed Nov. 3, 2014, 8 pages.

Office Action from U.S. Appl. No. 14/066,384, mailed Jan. 7, 2015, 24 pages.

Office Action from U.S. Appl. No. 14/145,439, mailed Feb. 12, 2015, 18 pages.

Office Action from U.S. Appl. No. 14/145,533, mailed Jan. 26, 2015, 13 pages.

Office Action from U.S. Appl. No. 14/145,607, mailed Mar. 20, 2015, 22 pages.

Office Action from U.S. Appl. No. 14/218,551, mailed Apr. 23, 2015, 9 pages.

Office Action from U.S. Appl. No. 14/218,575, mailed Feb. 10, 2015, 17 pages.

Notice of Allowance from U.S. Appl. No. 14/145,533, mailed May 11, 2015, 5 pages.

Office Action from U.S. Appl. No. 14/268,733, mailed Jul. 16, 2015, 13 pages.

Office Action from U.S. Appl. No. 14/218,575, mailed Aug. 7, 2015, 19 pages.

Office Action from U.S. Appl. No. 14/066,384, mailed Aug. 20, 2015, 23 pages.

Tronci R., et al., "Fusion of Multiple Clues for Photo-Attack Detection in Face Recognition Systems," International Joint Conference on Biometrics, 2011. pp. 1-6.

Uludag, Umut, and Anil K. Jain. "Attacks on biometric systems: a case study in fingerprints." Electronic Imaging 2004. International Society for Optics and Photonics, 2004, 12 pages.

Validity, OSTP Framework, 24 pages, 2010.

Vassilev, A.T.; du Castel, B.; Ali, A.M., "Personal Brokerage of Web Service Access," Security & Privacy, IEEE, vol. 5, No. 5, pp. 24-31, Sep.-Oct. 2007.

Willis N., Linux.com. Weekend Project: Take a Tour of Open Source Eye-Tracking Software. [Online] Mar. 2, 2012. [Cited: Nov. 1, 2012.], 4 pages. Retrieved from the Internet: URL: https://www.linux.com/learn/tutorials/550880-weekend-project-take-a-tour-of-opensource-eye-tracking-software.

Wilson R., "How to Trick Google's New Face Unlock on Android 4.1 Jelly Bean," Aug. 6, 2012, 5 pages, [online], [retrieved Aug. 13, 2015]. Retrieved from the Internet:.

World Wide Web Consortium, W3C Working Draft: Media Capture and Streams, 2013, 36 pages.

Zhang, "Security Verification of Hardware-enabled Attestation Protocols," IEEE, 2012, pp. 47-54.

Zhao W., et al., "Face Recognition: A Literature Survey," ACM Computing Surveys, 2003, vol. 35 (4), pp. 399-458.

Zhou, et al., "Face Recognition from Still Images and Videos". University of Maryland, College Park, MD 20742. Maryland : s.n., Nov. 5, 2004.pp. 1-23, Retrieved from the Internet: http://citeseerx.ist.psu.edu/viewdoc/download?doi=1 0.1.1.77.1312&rep=rep1&type=pdf.

National Science & Technology Council's Subcommittee on Biometrics. Biometrics Glossary. 33 pages, Last updated Sep. 14, 2006. NSTC. http://www.biometrics.gov/documents/glossary.pdf.

Nielsen, Jakib. useit.com. Jakob Nielsen's Alertbox—Horizontal Attention Leans Left. [Online] Apr. 6, 2010. [Cited: Nov. 1, 2012] 4 pages. http://www.useit.com/alertbox/horizontal-attention.html.

Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.

Non-Final Office Action from U.S. Appl. No. 13/730,761 mailed Feb. 27, 2014, 24 pages.

Non-Final Office Action from U.S. Appl. No. 13/730,761 mailed Sep. 9, 2014, 36 pages.

Non-Final Office Action from U.S. Appl. No. 13/730,776 mailed Jul. 15, 2014, 16 pages.

Non-Final Office Action from U.S. Appl. No. 13/730,780 mailed Aug. 4, 2014, 30 pages.

Non-Final Office Action from U.S. Appl. No. 13/730,780 mailed Mar. 12, 2014, 22 pages.

Non-Final Office Action from U.S. Appl. No. 13/730,791 mailed Jun. 27, 2014, 17 pages.

Non-Final Office Action from U.S. Appl. No. 13/730,795 mailed Jan. 5, 2015, 19 pages.

Non-Final Office Action from U.S. Appl. No. 13/730,795 mailed Jun. 11, 2014, 14 pages.

(56) References Cited

OTHER PUBLICATIONS

Non-Final Office Action from U.S. Appl. No. 14/066,273 mailed Jun. 16, 2016, 43 pages.
Non-Final Office Action from U.S. Appl. No. 14/066,273 mailed May 8, 2015, 31 pages.
Non-Final Office Action from U.S. Appl. No. 14/066,384 mailed Mar. 17, 2016, 40 pages.
Non-Final Office Action from U.S. Appl. No. 14/145,466 mailed Sep. 9, 2016, 13 pages.
Non-Final Office Action from U.S. Appl. No. 14/218,575 mailed Jan. 29, 2016, 25 pages.
Non-Final Office Action from U.S. Appl. No. 14/218,611 mailed Jun. 16, 2016, 13 pages.
Non-Final Office Action from U.S. Appl. No. 14/218,646 mailed Mar. 10, 2016, 23 pages.
Non-Final Office Action from U.S. Appl. No. 14/218,677 mailed Aug. 2, 2016, 15 pages.
Non-Final Office Action from U.S. Appl. No. 14/218,692 mailed Nov. 4, 2015, 16 pages.
Non-Final Office Action from U.S. Appl. No. 14/218,692 mailed Oct. 25, 2016, 33 pages.
Non-Final Office Action from U.S. Appl. No. 14/218,743 mailed Aug. 19, 2016, 11 pages.
Non-Final Office Action from U.S. Appl. No. 14/218,743 mailed Jan. 21, 2016, 12 pages.
Non-Final Office Action from U.S. Appl. No. 14/268,619 mailed Aug. 24, 2015, 17 pages.
Non-Final Office Action from U.S. Appl. No. 14/268,619 mailed Mar. 21, 2016, 7 pages.
Non-Final Office Action from U.S. Appl. No. 14/448,641 mailed Nov. 39, 2015, 21 pages.
Non-Final Office Action from U.S. Appl. No. 14/448,747 mailed Aug. 19, 2016, 21 pages.
Non-Final Office Action from U.S. Appl. No. 14/448,814 mailed Aug. 4, 2015, 13 pages.
Non-Final Office Action from U.S. Appl. No. 14/448,868 mailed Dec. 31, 2015, 12 pages.
Non-Final Office Action from U.S. Appl. No. 14/487,992 mailed Dec. 3, 2015, 15 pages.
Non-Final Office Action from U.S. Appl. No. 14/859,328 mailed Sep. 15, 2016, 39 pages.
Notice of Allowance from U.S. Appl. No. 14/487,992 mailed May 12, 2016, 11 pages.
Notice of Allowance from U.S. Appl. No. 13/730,761 mailed Jun. 10, 2015, 15 pages.
Notice of Allowance from U.S. Appl. No. 13/730,761 mailed Sep. 28, 2015, 5 pages.
Notice of Allowance from U.S. Appl. No. 13/730,776 mailed Feb. 13, 2015, 16 pages.
Notice of Allowance from U.S. Appl. No. 13/730,776 mailed Mar. 24, 2015, 3 pages.
Notice of Allowance from U.S. Appl. No. 13/730,780 mailed Aug. 13, 2015, 13 pages.
Notice of Allowance from U.S. Appl. No. 13/730,791 mailed Mar. 10, 2015, 17 pages.
Notice of Allowance from U.S. Appl. No. 13/730,795 mailed Jan. 14, 2016, 11 pages.
Notice of Allowance from U.S. Appl. No. 13/730,795 mailed May 15, 2015, 8 pages.
Notice of Allowance from U.S. Appl. No. 13/730,795 mailed Sep. 17, 2015, 11 pages.
Notice of Allowance from U.S. Appl. No. 14/066,384 mailed Sep. 27, 2016, 19 pages.
Notice of Allowance from U.S. Appl. No. 14/145,439 mailed Jul. 6, 2015, 6 pages.
Notice of Allowance from U.S. Appl. No. 14/145,439 mailed Mar. 14, 2016, 17 pages.
Notice of Allowance from U.S. Appl. No. 14/145,439 mailed Oct. 28, 2015, 12 pages.
Notice of Allowance from U.S. Appl. No. 14/145,533 mailed Jan. 20, 2016, 12 pages.
Notice of Allowance from U.S. Appl. No. 14/145,533 mailed Sep. 14, 2015, 13 pages.
Notice of Allowance from U.S. Appl. No. 14/145,607 mailed Feb. 1, 2016, 28 pages.
Notice of Allowance from U.S. Appl. No. 14/145,607 mailed Sep. 2, 2015, 19 pages.
Notice of Allowance from U.S. Appl. No. 14/268,619 mailed Oct. 3, 2016, 65 pages.
Notice of Allowance from U.S. Appl. No. 14/268,619 mailed Jul. 19, 2016, 5 pages.
Notice of Allowance from U.S. Appl. No. 14/268,686 mailed Apr. 18, 2016, 16 pages.
Notice of Allowance from U.S. Appl. No. 14/268,686 mailed Jul. 8, 2016, 4 pages.
Notice of Allowance from U.S. Appl. No. 14/268,686 mailed Mar. 30, 2016, 38 pages.
Notice of Allowance from U.S. Appl. No. 14/268,686 mailed Nov. 5, 2015, 23 pages.
Notice of Allowance from U.S. Appl. No. 14/268,733 mailed Sep. 23, 2016, 8 pages.
Notice of Allowance from U.S. Appl. No. 14/448,641 mailed Jun. 7, 2016, 13 pages.
Notice of Allowance from U.S. Appl. No. 14/448,697 mailed Jan. 14, 2016, 23 pages.
Notice of Allowance from U.S. Appl. No. 14/448,697 mailed May 20, 2016, 14 pages.
Notice of Allowance from U.S. Appl. No. 14/448,697 mailed Sep. 1, 2016, 3 pages.
Notice of Allowance from U.S. Appl. No. 14/448,697 mailed Sep. 15, 2015, 14 pages.
Notice of Allowance from U.S. Appl. No. 14/487,992 mailed Dec. 27, 2016, 28 pages.
Notice of Allowance from U.S. Appl. No. 14/487,992 mailed Sep. 6, 2016, 26 pages.
Notification Concerning Transmittal of International Preliminary Report on Patentability for Application No. PCT/US14/39627, mailed on Dec. 10, 2015, 8 pages.
Notification of Transmittal of the International Search Report and the Written Opinion from counterpart Patent cooperation Treaty Application No. PCT/US13/77888, mailed Aug. 4, 2014, 10 pages.
Notification of Transmittal of the International Search Report and the Written Opinion from counterpart Patent cooperation Treaty Application No. PCT/US14/39627, mailed Oct. 16, 2014, 10 pages.
Notification of Transmittal of the International Search Report and the Written Opinion from counterpart Patent cooperation Treaty Application No. PCT/US15/50348, mailed Dec. 22, 2015, 9 gages.
Notification of Transmittal of the International Search Report and the Written Opinion from counterpart Patent Cooperation Treaty Application No. PCT/US2015/042786, mailed Oct. 16, 2015, 8 pages.
Notification of Transmittal of the International Search Report and the Written Opinion from counterpart Patent Cooperation Treaty Application No. PCT/US2015/042799, mailed Oct. 16, 2015, 8 pages.
Notification of Transmittal of the International Search Report and the Written Opinion from counterpart Patent Cooperation Treaty Application No. PCT/US2015/042870, mailed Oct. 30, 2015, 9 pages.
Notification of Transmittal of the International Search Report and the Written Opinion from counterpart Patent Cooperation Treaty Application No. PCT/US2015/42783, mailed Oct. 19, 2015, 13 pages.
Notification of Transmittal of the International Search Report and the Written Opinion from counterpart Patent Cooperation Treaty Application No. PCT/US2015/42827, mailed Oct. 30, 2015, 9 gages.
Notification of Transmittal or International Search Report and Written Opinion from PCT/US2015/028927, mailed Jul. 30, 2015, 12 pages.

(56) References Cited

OTHER PUBLICATIONS

Pan G., et al., "Liveness Detection for Face Recognition" in: Recent Advances in Face Recognition, 2008, pp. 109-124, Vienna : I-Tech, 2008, Ch. 9, ISBN: 978-953-7619-34-3.
Pan G., et al., "Monocular Camera-based Face Liveness Detection by Combining Eyeblink and Scene Context," pp. 215-225, s.l. : Springer Science+Business Media, LLC, Aug. 4, 2010. Retrieved from the Internet: URL: http://www.cs.zju.edu.cn/-gpan/publication/2011-TeleSysliveness.pdf.
Peng Y., et al., "RASL: Robust Alignment by Sparse and Low-Rank Decomposition for Linearly Correlated Images", IEEE Conference on Computer Vision and Pattern Recognition, 2010, pp. 763-770. Retrieved from the Internet: URL: http://yima.csl.illinois.edu/psfile/RASL CVPR10.pdf.
Phillips P. J., et al., "Biometric Image Processing and Recognition," Chellappa, 1998, Eusipco, 8 pages.
Phillips P.J., et al., "Face Recognition Vendor Test 2002: Evaluation Report," s.l. : NISTIR 6965, 2002, 56 pages. Retrieved from the Internet: URL: http://www.facerec.org/vendors/FRVT2002_Evaluation_Report.pdf.
Phillips P.J., et al., "FRVT 2006 and ICE 2006 Large-Scale Results", NIST IR 7408, Gaithersburg, NIST, 2006, Mar. 29, 2007, pp. 1-55.
Pinto A., et al., "Video-Based Face Spoofing Detection through Visual Rhythm Analysis," Los Alamitos : IEEE Computer Society Conference Publishing Services, 2012, Conference on Graphics, Patterns and Images, 8 pages. (SIBGRAPI). Retrieved from the Internet: URL: http://sibgrapi.sid.inpe.br/rep/sid.inpe.br/sibgrapi/2012/07.13.21.16?-mirror=sid.inpe.br/ banon/2001/03.30.15.38.24&metadatarepository=sid.inpe.br/sibgrapi/2012/07.13.21.1 6.53.
Quinn G.W., et al., "Performance of Face Recognition Algorithms on Compressed Images", NIST Inter Agency Report 1830, NIST, Dec. 4, 2011, 35 pages.
Ratha N.K., et al., "An Analysis of Minutiae Matching Strength," Audio-and Video-Based Biometric Person 4uthentication, Springer Berlin Heidelberg, 2001, 7 pages.
Ratha N.K., et al., "Enhancing Security and Privacy in Biometrics-Based Authentication Systems," IBM Systems Journal, 2001, vol. 40 (3), pp. 614-634.
Requirement for Restriction/Election from U.S. Appl. No. 14/218,504 mailed Aug. 16, 2016, 11 pages.
Roberts C., "Biometric Attack Vectors and Defences," Sep. 2006, 25 pages. Retrieved from the Internet: URL: http://otago.ourarchive.ac.nz/bitstream/handle/10523/1243/BiometricAttackVectors.pdf.
Rocha A., et al., "Vision of the Unseen: Current Trends and Challenges in Digital Image and Video Forensics," ACM computing Surveys, 2010, 47 pages. Retrieved from the Internet: URL: http://www.wjscheirer.com/papers/wjscsur2011forensics.pdf.
Rodrigues R.N., et al., "Robustness of Multimodal Biometric Fusion Methods Against Spoof Attacks," Journal of Visual Language and Computing. 2009. 11 pages, doi:10.1016/j.vlc.2009.01.010; Retrieved from the Internet: URL: http://cubs.buffalo.edu/govind/papers/visual09.pdf.
Ross A., et al., "Multimodal Biometrics: An Overview," Proceedings of 12th European Signal Processing Conference (EUPISCO), Sep. 2004, pp. 1221-1224. Retrieved from the Internet: URL: http://www.csee.wvu.edu/-ross/pubs/RossMultimodaiOverviewEUSIPC004.pdf.
Schneier B., Biometrics: Uses and Abuses. Aug. 1999. Inside Risks 110 (CACM 42, Aug. 8, 1999), Retrieved Tom the Internet: URL: http://www.schneier.com/essay-019.pdf, 3 pages.
Schuckers, "Spoofing and Anti-Spooling Measures," Information Security Technical Report, 2002, vol. 2002, pp. 56-62.
Schwartz et al., "Face Spoofing Detection Through Partial Least Squares and Low-Level Descriptors," International Conference on Biometrics, 2011, vol. 2011, pp. 1-8.
Smiatacz M., et aL, Gdansk University of Technology. Liveness Measurements Using Optical Flow for Biometric Person Authentication. Metrology and Measurement Systems. 2012, vol. XIX, 2. pp. 257-268.

Supplementary Partial European Search Report for Application No. 13867269, mailed Aug. 3, 2016, 7 pages.
T. Weigold et al., "The Zurich Trusted Information Channel—An Efficient Defence against Man-in-the-Middle and Vlalicious Software Attacks," P. Lipp, A.R. Sadeghi, and K.M. Koch, eds., Proc. Trust Conf. (Trust 2008), LNCS 4968, Springer-Verlag, 2008, pp. 75-91.
Tan et al., "Face Liveness Detection from a Single Image with Sparse Low Rank Bilinear Discriminative Model," European Conference on Computer Vision, 2010, vol. 2010, pp. 1-14.
The Extended M2VTS Database, [retrieved on Sep. 29, 2012], Retrieved from the Internet: URL: http://www.ee.surrey.ac.uk/CVSSP/xm2vtsdb/, 1 page.
The source for Linux information, Linux.com, [online], [retrieved on Jan. 28, 2015], 2012, 3 pages.
Transmittal of International Preliminary Report on Patentability for Patent Application No. PCT/US2013/077888 mailed on Jul. 9, 2015, 7 pages.
Transmittal of International Preliminary Report on Patentability from foreign counterpart PCT Patent Application No. PCT/US2014/031344 mailed Oct. 1, 2015, 9 pages.
Tresadern P., et al., "Mobile Biometrics (MoBio): Joint Face and Voice Verification for a Mobile Platform", 2012, 7 pages. Retrieved from the Internet: URL: http://personal.ee.surrey.ac.uk/Personai/Norman.Poh/data/tresadern_PervComp2012draft.pdf.
Abate A., et al.,"2D and 3D face recognition: A survey", 2007, pp. 1885-1906.
Advisory Action from U.S. Appl. No. 13/730,791 mailed Jan. 23, 2015, 4 pages.
Akhtar Z., et al., "Spoof Attacks on Multimodal Biometric Systems", International Conference on Information and Network Technology, 2011, vol. 4, pp. 46-51.
Bao, W., et al., "A liveness detection method for face recognition based on optical flow field", 2009, pp. 233-236, http://ieeexplore.ieee.org/stamp/stamp.jsp?tp=&amumber=5054589&isnumber=5054562.
Barker E., et al., "Recommendation for key management Part 3: Application -Specific Key Management Guidance", NIST Special Publication 800-57, 2009, pp. 1-103.
Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https://eprint.iacr.org/2004/205.pdf.
Chakka M., et al., "Competition on Counter Measures to 2-D Facial Spoofing Attacks". 6 pages. .2011. http://www.csis.pace.edu/-ctappert/dps/IJCB2011/papers/130.pdf. 978-1-4577-1359- 0/11.
Chen L., et al., "Flexible and scalable digital signatures in TPM 2.0." Proceedings of the 2013 ACM SIGSAC conference on Computer & communications security. ACM, 2013, 12 pages.
Chetty G. School of ISE University of Canberra Australia. "Multilevel liveness verification for face-voice biometric authentication". BYSM-2006 Symposium. Baltimore: BYSM-Symposium 9 pages. Sep. 19, 2006. http://www.biometrics.org/bc2006/presentations/Tues_Sep_19/BSYM/19_Chetty_research.pdf.
Dawei Zhang; Peng Hu, "Trusted e-commerce user agent based on USB Key", Proceedings of the International MultiConference of Engineers and Computer Scientists 2008 vol. I, IMECS 2008, Mar. 19-21, 2008, Hong Kong, 7 pages.
Delac K. et al., Eds., InTech, Jun. 1, 2008, Retrieved from the Internet:, ISBN 978-953-7619-34-3, Uploaded as Individual Chapters 1-15, 15 pages.
Doherty, et al., Internet Engineering Task Force (IETF), "Dynamic Symmetric Key Provisioning Protocol (DSKPP)", Dec. 2010, 105 pages.
Edited by Kresimir Delac, Mislay Grgic and Marian Stewart Bartlett. s.l. : InTech Jun. 1, 2008. http://cdn.intechopen.com/finals/81/InTech-Recent_advances_in_face_recognition.zip. ISBN 978-953-7619-34-3. Uploaded as Chapters 1-15.
Extended European Search Report for Application No. 13867269, mailed Nov. 4, 2016, 10 pages.
Extended European Search Report for Application No. 14803988.6, mailed Dec. 23, 2016, 10 pages.

(56) References Cited

OTHER PUBLICATIONS

Final Office Action from U.S. Appl. No. 13/730,761 mailed Jan. 15, 2015, 31 pages.
Final Office Action from U.S. Appl. No. 13/730,761 mailed Jul. 8, 2014, 36 pages.
Final Office Action from U.S. Appl. No. 13/730,776 mailed Nov. 3, 2014, 20 pages.
Final Office Action from U.S. Appl. No. 13/730,780 mailed Jan. 27, 2015, 30 pages.
Final Office Action from U.S. Appl. No. 13/730,780 mailed May 12, 2014, 34 pages.
Final Office Action from U.S. Appl. No. 13/730,791 mailed Nov. 13, 2014, 22 pages.
Final Office Action from U.S. Appl. No. 13/730,795 mailed Aug. 14, 2014, 20 pages.
Final Office Action from U.S. Appl. No. 14/066,273 mailed Feb. 11, 2016, 29 pages.
Final Office Action from U.S. Appl. No. 14/066,273 mailed Jan. 10, 2017, 24 pages.
Final Office Action from U.S. Appl. No. 14/218,575 mailed Jul. 7, 2016, 29 pages.
Final Office Action from U.S. Appl. No. 14/218,646 mailed Aug. 11, 2016, 25 pages.
Final Office Action from U.S. Appl. No. 14/218,692 mailed Mar. 2, 2016, 24 pages.
Final Office Action from U.S. Appl. No. 14/268,619 mailed Dec. 14, 2015, 10 pages.
Final Office Action from U.S. Appl. No. 14/268,733 mailed Jan. 15, 2016, 14 pages.
Final Office Action from U.S. Appl. No. 14/448,814 mailed Feb. 16, 2016, 14 pages.
Final Office Action from U.S. Appl. No. 14/448,814 mailed Jun. 14, 2016, 17 pages.
Final Office Action from U.S. Appl. No. 14/448,868 mailed Aug. 19, 2016, 11 pages.
Grother, P.J., et al., NIST. Report on the Evaluation of 2D Still-Image Face Recognition Algorithms, NIST IR 7709. s.l, NIST, 2011, Jun. 22, 2010, pp. 1-58.
GSM Arena. [Online] Nov. 13, 2011, [Cited: Sep. 29, 2012], 2 pages, [retrieved on Aug. 18, 2015]. Retrieved from the Internet: URL: http://www.gsmarena.com/ice_cream_sandwichs_face_unlock_duped_using_a_photograph-news-3377.php.
Heikkila M., et al., "A Texture-Based Method for Modeling the Background and Detecting Moving Objects", Oulu : IEEE, Jun. 22, 2005, Draft, Retrieved from the Internet: URL: , 16 pages.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] Retrieved from the Internet: URL:http://eyetools.com/articles/p3-understanding-eye-tracking-what-is-a-heatmap-really.
Himanshu, et al., "A Review of Face Recognition". International Journal of Research in Engineering & Applied Sciences. Feb. 2012, vol. 2, pp. 835-846. Retrieved from the Internet: URL:http://euroasiapub.org/IJREAS/Feb2012/81.pdf.
Huang L., et al., "Clickjacking: Attacks and Defenses". S.I. : Usenix Security 2012, pp. 1-16, 2012 [online]. Retrieved from the Internet: URL:https://www.usenix.org/system/files/conference/usenixsecurity12/sec12-final39.pdf.
International Preliminary Report on Patentability for Application No. PCT/US2015/028924 mailed Nov. 17, 2016, 9 pages.
International Preliminary Report on Patentability for Application No. PCT/US2015/028927 mailed Nov. 17, 2016, 10 pages.
International Search Report and Written Opinion for Application No. PCT/US2015/028924 mailed Jul. 30, 2015, 10 pages.
Jafri R., et al. "A Survey of Face Recognition Techniques," Journal of Information Processing Systems, 2009, vol. 5 (2), pp. 41-68.
Julian J., et al., "Biometric Enabled Portable Trusted Computing Platform," Trust Security and Privacy in Computing and Communications (TRUSTCOM), 2011 IEEE 10th International Conference on Nov. 16, 2011, pp. 436-442, XP032086831, DOI:10.1109/TRUSTCOM2011.56, ISBN: 978-1-4577-2135-9.
Kollreider K., et al., "Evaluating Liveness by Face Images and the Structure Tensor," Halmstad, Sweden: s.n., Halmstad University, SE-30118, Sweden, [online], 2005, Retrieved from the Internet: URL: http://citeseerx.ist.psu.edu/riewdoc/download?doi=10.1.1.62.6534&rep=rep1 &type=pdf, pp. 75-80.
Kollreider K., et al., "Non-Instrusive Liveness Detection by Face Images," Image and Vision Computing, 2007, vol. 27 (3), pp. 233-244.
Kong S., et al. "Recent Advances in Visual and Infrared Face Recognition: A Review," Journal of Computer Vision and Image Understanding, 2005, vol. 97 (1), pp. 103-135.
Li J., et al., "Live Face Detection Based on the Analysis of Fourier Spectra," Biometric Technology for Human Identification, 2004, pp. 296-303.
Lubin, G., et al., "16 Heatmaps That Reveal Exactly Where People Look," Business Insider, [online], May 21, 2012, :Cited: Nov. 1, 2012], Retrieved from the Internet: URL: http://www.businessinsider.com/eye-tracking-heatmaps-2012-5?pp=1, pp. 1-21.
Maata J., et al., "Face Spoofing Detection From Single Images Using Micro-Texture Analysis," Machine Vision Group, University of Oulu, Finland, Oulu, IEEE, [online], 2011, Retrieved from the Internet: URL: http://www.ee.oulu.fi/research/mvmp/mvg/files/pdf/131.pdf., pp. 1-7.
Marcialis G.L., et al. "First International Fingerprint Liveness Detection Competition-Livdet 2009," Image Analysis and Processing-ICIAP, Springer Berlin Heidelberg, 2009. pp. 12-23.
Kim et al., "Secure User Authentication based on the Trusted Platform for Mobile Devices," EURASIP Journal on Wireless Communications and Networking, pp. 1-15.
Non-Final Office Action from U.S. Appl. No. 14/066,273 dated May 18, 2017, 46 pages.
Notice of Allowance from U.S. Appl. No. 14/066,384, dated May 23, 2017, 50 pages.
Communication Pursuant to Rules 161(2) and 162 EPC for EP Application No. 15826364.0, dated Mar. 7, 2017, 2 pages.
Extended European Search Report from European Patent Application No. 14770682.4, dated Jan. 17, 2017, 14 pages.
Final Office Action from U.S. Appl. No. 14/145,466, dated Apr. 13, 2017, 51 pages.
Final Office Action from U.S. Appl. No. 14/218,611, dated Jan. 27, 2017, 14 pages.
Final Office Action from U.S. Appl. No. 14/218,692, dated Feb. 28, 2017, 27 pages.
Final Office Action from U.S. Appl. No. 14/218,743, dated Mar. 3, 2017, 57 pages.
Final Office Action from U.S. Appl. No. 14/448,747, dated Feb. 13, 2017, 74 pages.
Final Office Action from U.S. Appl. No. 14/859,328, dated Mar. 6, 2017, 26 pages.
Non-Final Office Action from U.S. Appl. No. 14/218,504, dated Feb. 27, 2017, 12 pages.
Non-Final Office Action from U.S. Appl. No. 14/218,575, dated May 4, 2017, 88 pages.
Non-Final Office Action from U.S. Appl. No. 14/218,646, dated Mar. 27, 2017, 24 pages.
Non-Final Office Action from U.S. Appl. No. 14/218,677, dated Feb. 10, 2017, 18 pages.
Non-final Office Action from U.S. Appl. No. 14/268,563, dated Apr. 21, 2017, 83 pages.
Non-Final Office Action from U.S. Appl. No. 14/448,814, dated Apr. 5, 2017, 57 pages.
Notice of Allowance from U.S. Appl. No. 14/268,733, dated Jan. 20, 2017, 62 pages.
Notice of Allowance from U.S. Appl. No. 14/448,868, dated Apr. 27, 2017, 52 pages.
Notice of Allowance from U.S. Appl. No. 14/448,868, dated Mar. 23, 2017, 57 pages.
Notice of Allowance from U.S. Appl. No. 14/487,992, dated Apr. 12, 2017, 14 pages.
Office Action from foreign counterpart Taiwan Patent Application No. 102148853, dated Feb. 17, 2017, 9 pages.

(56) References Cited

OTHER PUBLICATIONS

Partial Supplementary European Search Report from European Patent Application No. 14770682.4, dated Oct. 14, 2016, 8 pages.
TechTarget, What is network perimeter? Definition from WhatIs.com downloaded from http://searchnetworking.techtarget.com/definition/network-perimeter on Apr. 14, 2017, 5 pages.
Extended European Search Report for Application No. 15786487.7, dated Oct. 23, 2017, 8 pages.
Final Office Action from U.S. Appl. No. 14/066,273, dated Sep. 8, 2017, 30 pages.
Final Office Action from U.S. Appl. No. 14/218,504, dated Sep. 12, 2017, 83 pages.
Final Office Action from U.S. Appl. No. 14/218,575, dated Jul. 31, 2017, 42 pages.
Final Office Action from U.S. Appl. No. 14/218,646, dated Sep. 27, 2017, 81 pages.
Final Office Action from U.S. Appl. No.14/218,677, dated Sep. 28, 2017, 16 pages.
Final Office Action from U.S. Appl. No. 14/448,814 dated Oct. 6, 2017, 24 pages.
First Office Action and Search Report from foreign counterpart China Patent Application No. 201380068869.3, dated Sep. 19, 2017, 15 pages. (translation available only for office action).
First Office Action and Search Report from foreign counterpart China Patent Application No. 201480025959.9, dated Jul. 7, 2017, 10 pages.
International Preliminary Report on Patentability for Application No. PCT/US2015/042786, dated Feb. 9, 2017, 7 pages.
International Preliminary Report on Patentability for Application No. PCT/US2015/042799, dated Feb. 9, 2017, 7 pages.
International Preliminary Report on Patentability for Application No. PCT/US2015/042870, dated Feb. 9, 2017, 8 pages.
International Preliminary Report on Patentability for Application No. PCT/US2015/050348, dated Mar. 30, 2017, 7 pages.
International Preliminary Report on Patentability for Application No. PCT/US2015/42783, dated Feb. 9, 2017, 12 pages.
International Preliminary Report on Patentability for Application No. PCT/US2015/42827, dated Feb. 9, 2017, 6 pages.
Martins R A., et al., "A Potpourri of Authentication Mechanisms the Mobile Device Way," CISTI, Jan. 2013, pp. 343-848.
Non-Final Office Action from U.S. Appl. No. 14/218,611, dated Sep. 19, 2017, 76 pages.
Non-Final Office Action from U.S. Appl. No. 14/218,692, dated Sep. 19, 2017, 37 pages.
Non-Final Office Action from U.S. Appl. No. 14/218,743, dated Aug. 2, 2017, 24 pages.
Non-Final Office Action from U.S. Appl. No. 14/859,328, dated Jul. 14, 2017, 29 pages.
Non-Final Office Action from U.S. Appl. No. 15/396,452 dated Oct. 13, 2017, 76 pages.
Non-Final Office action from U.S. Appl. No. 15/595,460, dated Jul. 27, 2017, 9 pages.
Notice of Allowance from U.S. Appl. No. 14/066,384, dated Jul. 26, 2017, 20 pages.
Notice of Allowance from U.S. Appl. No. 14/448,747, dated Jun. 20, 2017, 14 pages.
Notice of Allowance from U.S. Appl. No. 14/448,868, dated Jun. 26, 2017, 14 pages.
Notice of Allowance from U.S. Appl. No. 14/487,992, dated Jul. 17, 2017, 8 pages.
Notice of Allowance from U.S. Appl. No. 14/487,992, dated Jun. 14, 2017, 14 pages.
Final Office Action from U.S. Appl. No. 14/268,563, dated Nov. 3, 2017, 46 pages.
Notice of Allowance from U.S. Appl. No. 14/066,384, dated Dec. 1, 2017, 23 pages.
Notice of Allowance from U.S. Appl. No. 14/448,868, dated Nov. 17, 2017, 15 pages.
Extended European Search Report for Application No. 15786796.1, dated Nov. 3, 2017, 9 pages.
Extended European Search Report for Application No. 15826660.1, dated Nov. 16, 2017, 9 pages.
Extended European Search Report for Application No. 15827334.2, dated Nov. 17, 2017, 8 pages.
International Search Report and Written Opinion for Application No. PCT/US2017/045534, dated Nov. 27, 2017, 14 pages.
Kim H.C., et al., "A Design of One-Time Password Mechanism Using Public Key Infrastructure," Networked Computing and Advanced Information Management, 2008, NCM'08, 4th International Conference on IEEE, Sep. 2, 2008, pp. 18-24.
Office Action and Search Report from foreign counterpart Chinese Patent Application No. 201480031042.X, dated Dec. 4, 2017, 20 pages.
Starnberger G., et al., "QR-TAN: Secure Mobile Transaction Authentication," Availability, Reliability and Security, 2009, ARES'09, International Conference on IEEE, Mar. 16, 2009, pp. 578-585.
Uymatiao M.L.T., et al., "Time-based OTP authentication via secure tunnel (TOAST); A mobile TOTP scheme using TLS seed exchage and encrypted offline keystore," 2014 4th IEEE International Conference on Information Science and Technology, IEEE, Apr. 26, 2014, pp. 225-229.

\* cited by examiner

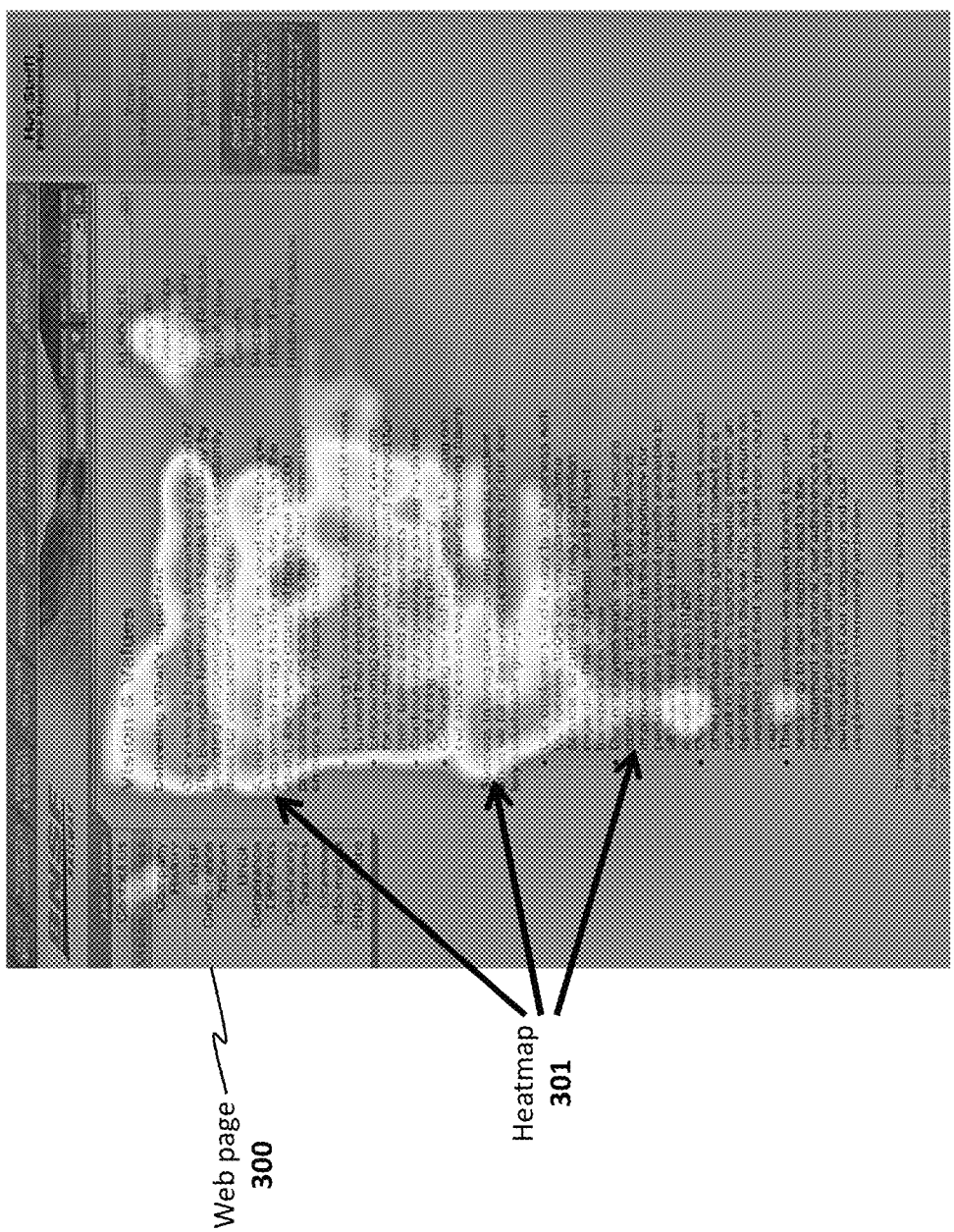

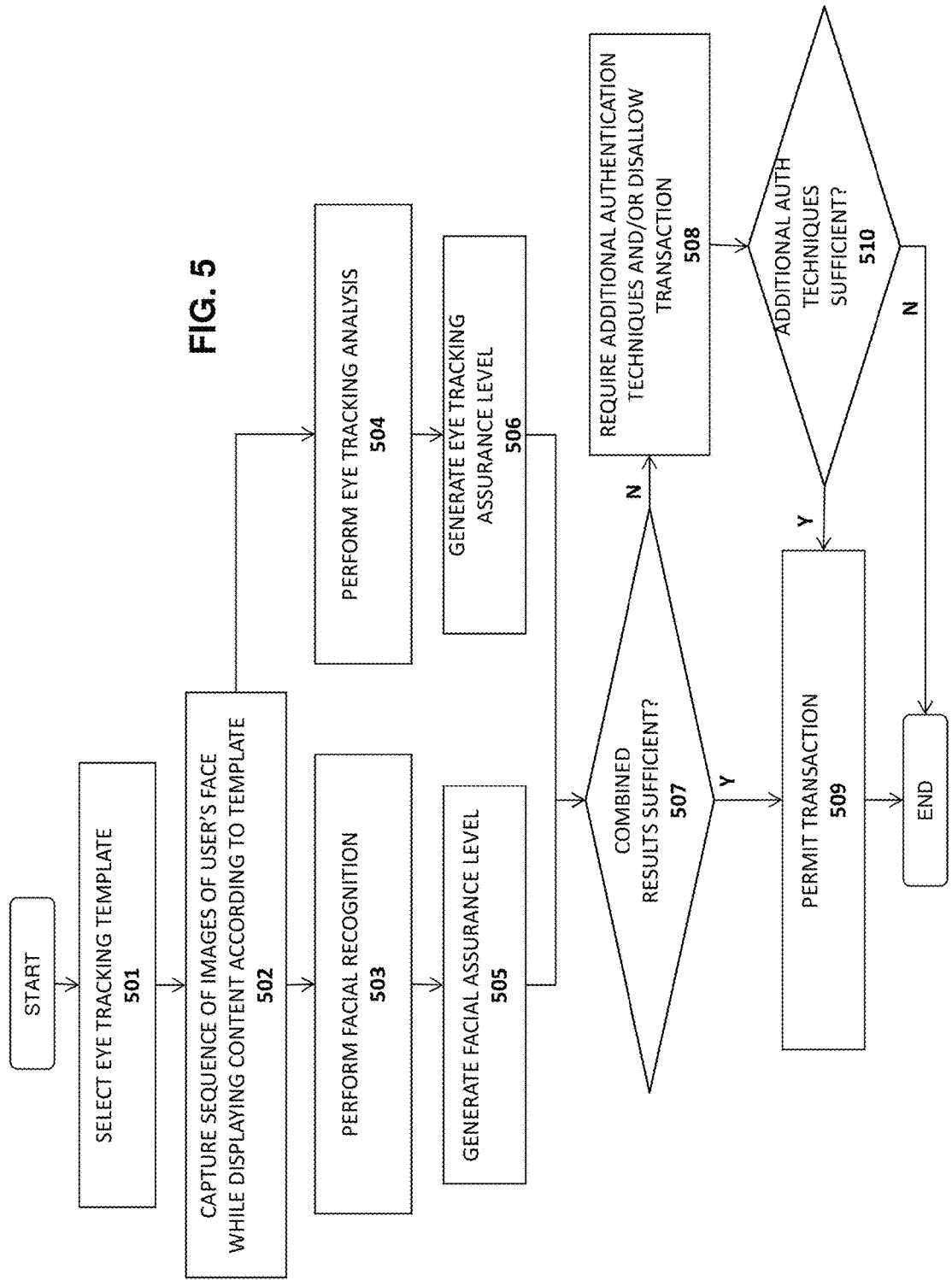

SYSTEM AND METHOD FOR EYE TRACKING DURING AUTHENTICATION

CROSS REFERENCE TO RELATED APPLICATIONS

This application claims the benefit of and priority to U.S. Provisional Patent Application No. 61/804,568, filed, Mar. 22, 2013, entitled, "Advanced Methods of Authentication And Its Applications".

BACKGROUND

Field of the Invention

This invention relates generally to the field of data processing systems. More particularly, the invention relates to a system and method for performing eye tracking techniques to improve authentication.

Description of Related Art

Systems have been designed for providing secure user authentication over a network using biometric sensors. In such systems, the score generated by the application, and/or other authentication data, may be sent over a network to authenticate the user with a remote server. For example, Patent Application No. 2011/0082801 ("'801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

In general, authentication techniques are robust against spoofing if (a) secret information is used for authentication or (b) it is hard to produce a fake input. Most systems today rely on password-based authentication. Passwords are easy to reproduce, so they need to be kept secure. Consequently, password attacks typically focus on gaining access to a user's password. Recent attacks have demonstrated the vulnerability of servers on which the passwords are stored for verification.

In contrast to password-based authentication, when using biometrics for authentication, the biometric information typically is public. For example, a fingerprint can be retrieved from (almost) any object touched by the user. Similarly, a user's face is typically not hidden and hence can be seen and captured by anyone and is often published on social networks.

In the real world, we can rely on our own recognition abilities when we see a person, because it is hard to "produce" another person having the same biometric characteristics. For example, it is still hard to "produce" another person having the same face and mannerisms. This is why governments include pictures of the face in passports, ID cards, drivers licenses and other documents. In the virtual world, however, we don't have to "produce" another person with the same face in order to spoof the system, but only something that the computer would recognize such as a picture of the face. In other words, "[t]he moral is that biometrics work well only if the verifier can verify two things: one, that the biometric came from the person at the time of verification, and two, that the biometric matches the master biometric on file" (see Reference 1 from the list of references provided prior to the claims of the present specification).

In the past, research on automatic face recognition has focused on reliable recognition of faces using still images and video. See, e.g., Reference 2 below. Several relatively robust face recognition techniques exist and systems are commercially available today (see Reference 3). However, little attention has been paid to "liveness" detection, i.e., "verification . . . that the biometric matches the master biometric on file." In several use cases, spoofing protection is either not required or it is still being performed by humans (e.g., for law enforcement applications).

The ubiquity of cameras in computing devices such as notebooks and smart phones on one hand, and the weakness of passwords as the most prevalent authentication method on the other hand, drive the adoption of biometric authentication methods in general, and face recognition in particular. The first large scale "trial" of face recognition as an authentication method was done in Google Android 4 (aka, "Ice Cream Sandwich") and was based on still image recognition. These techniques can be fooled easily with photographs (See Reference 4). Even improved methods which include some sort of liveness detection in Android 4.1 (aka, "Jelly Bean") can easily be spoofed by presenting two photos in a sequence, one with open eyes and an electronically modified one with closed eyes on a computer display to the camera (see Reference 5).

Though it can be argued that this weakness is due to resource limitations on mobile devices, it also appears that commercial software available for PCs and even the research of anti-spoofing detection is not yet very mature. The assignee of the present application performed tests with PC-based face recognition software which confirms this finding:

Cogent BioTrust 3.00.4063, operated on a Windows 7® based Samsung Series 5® Notebook, performs no liveness check at all, even with security settings set to "high." A simple face image, displayed on a normal computer monitor was sufficient to successfully spoof the system.

KeyLemon 2.6.5, operated on a Macbook Air® performs simple blink tests as liveness check. It can be successfully spoofed by displaying a sequence of 3 images: (1) a real image of the face (e.g., created by a web cam); (2) a modification of the real image, where the eyes have been re-colored to look as if they are closed; (3) the real image again.

Anti-Spoofing detection is not part of standard tests such as the NIST biometric vendor tests when comparing different algorithms. See, e.g., References 6-8. One of the first known public competitions, organized by several researchers in 2011 (see Reference 9) showed early success of some algorithms, but it was based on videos with a resolution of 320×240 pixels. Typical computing devices provide resolutions of the front-facing cameras of at least 640×480 pixel.

FIG. 1 illustrates an exemplary client 120 with a biometric device 100 for performing facial recognition. When operated normally, a biometric sensor 102 (e.g., a camera) reads raw biometric data from the user (e.g., snaps a photo of the user) and a feature extraction module 103 extracts specified characteristics of the raw biometric data (e.g., focusing on certain facial features, etc). A matcher module 104 compares the extracted features with biometric template data 110 stored in a secure storage on the client 120 and generates a score and/or a yes/no response based on the similarity between the extracted features and the biometric template data 110. The biometric template data 110 is typically the result of an enrollment process in which the user enrolls a facial image or other biometric data with the device 100. An application 105 may then use the score or yes/no result to determine whether the authentication was successful.

There are multiple potential points of attack in order to spoof a facial recognition system (see References 10, 11), identified in FIG. 1 as (1)-(8). There are well known protection mechanisms for ensuring the integrity of the biometric templates (6) (e.g., by using electronic signatures) and protecting the integrity of feature extraction (3), feature vector (4), the matcher (5) and its final result (8) (e.g., by applying a combination of (a) white box encryption methods, (b) code obfuscation and (c) device binding).

Protection mechanisms against replaying old captured data to the feature extraction unit (2) are (at least theoretically) covered by the approach of the Trusted Computing Group and by potential extensions to ARM TrustZone. Basically, the approach is to add cryptographic protection mechanisms (e.g. HMAC or electronic signatures) to the sensor and encapsulate the sensor in a tamper proof way, similar to the protection mechanisms used in current smart card chips. The feature extraction engine could then verify the integrity of the incoming data.

BRIEF DESCRIPTION OF THE DRAWINGS

A better understanding of the present invention can be obtained from the following detailed description in conjunction with the following drawings, in which:

FIG. 3 illustrates an exemplary heatmap for a Web page employed in one embodiment of the invention;

FIG. 5 illustrates one embodiment of a method for performing eye-tracking and facial recognition-based authentication;

DETAILED DESCRIPTION OF PREFERRED EMBODIMENTS

Figure 1:
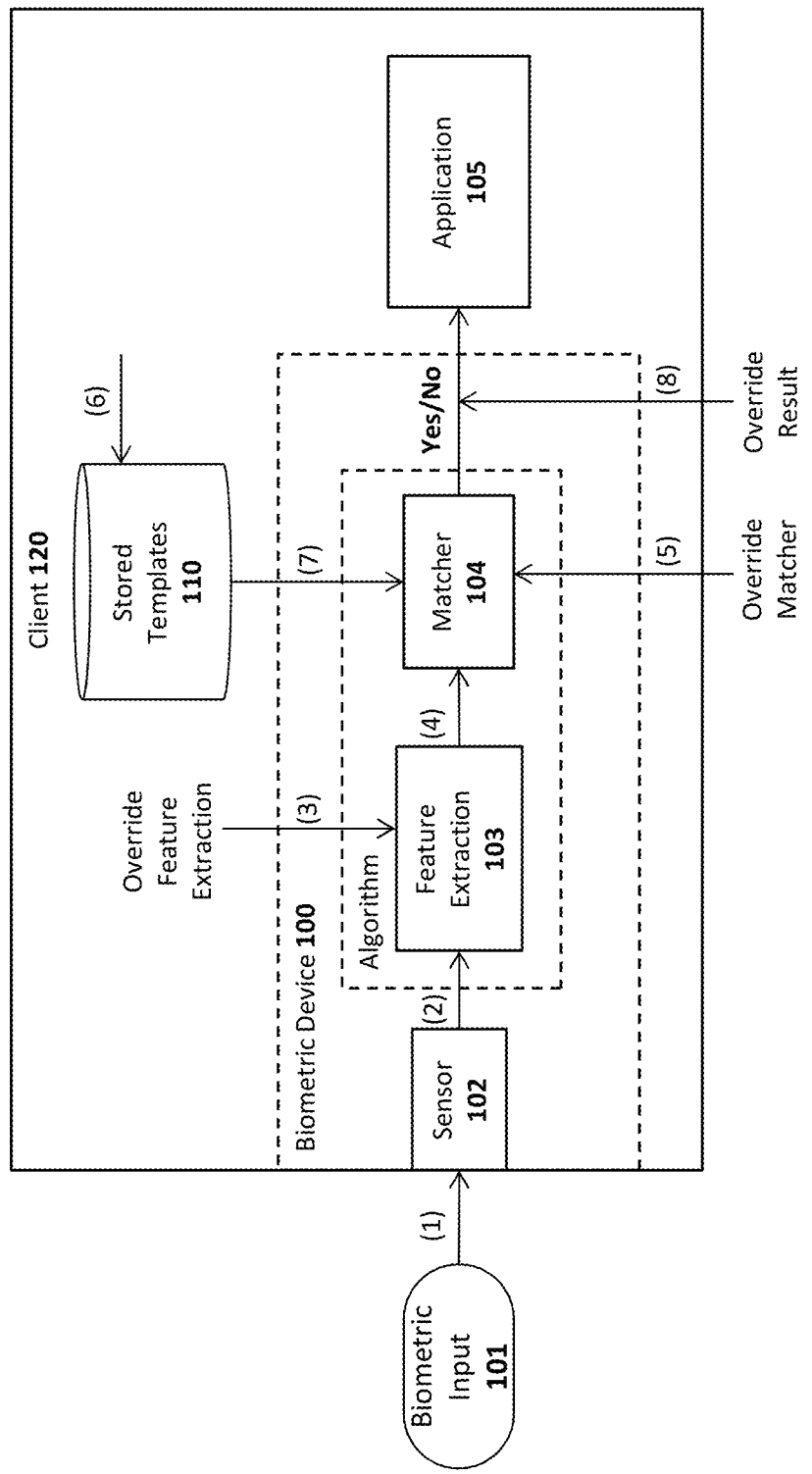
FIG. 1 illustrates an exemplary client equipped with a biometric device.

Described below are embodiments of an apparatus, method, and machine-readable medium for performing eye-tracking techniques during authentication. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve client devices with authentication capabilities such as biometric devices or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, speaker recognition hardware/software (e.g., a microphone and associated software for recognizing a speaker), and optical recognition capabilities (e.g., an optical scanner and associated software for scanning the retina of a user). The authentication capabilities may also include non-biometric devices such as trusted platform modules (TPMs) and smartcards or secure elements.

As mentioned above, in a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication and integrity protection) and/or whether a hacker has compromised the biometric device. Confidence in the biometric device depends on the particular implementation of the device.

One embodiment of the invention uses "normal" authentication techniques (e.g., capturing a sequence of images, swiping a finger, entering a code, etc) in order to train the authentication system to recognize non-intrusive authentication situations. In addition, one embodiment returns the authentication state of the device to the relying party rather than sensitive information such as a Machine ID when authentication is required.

Techniques for Protecting Against Fake Biometrics

While the embodiments of the invention described below utilize eye tracking techniques to confirm the "liveness" of the user, in one embodiment, these techniques are combined with one or more existing techniques for detecting fake biometrics (see Reference 1). This is an area of ongoing research. Existing research has identified four different classes of protection approaches for fake biometrics (see Reference 12):
1. Data-driven characterization
  a. Still Images
    i. Detect resolution degradation by re-scanning images analyzing 2D Fourier spectrum (Reference 13)
    ii. Exploiting different reflection characteristics of real faces versus image prints. The theory of this is based on the Lambertian reflectance properties (Reference 14)
    iii. Exploiting different micro texture of real face and image prints (Reference 15) due to printing defects.
    iv. Exploiting quality degradation and noise addition on printed images combined with other methods (Reference 16).
  b. Videos
    v. Each camera sensor has its own characteristics and re-capturing a video displayed on a monitor causes artifacts. This can be used to detect spoofing (Reference 12).
    vi. In the case of spoofing with images, there is a face-background dependency (Reference 17).
    vii. In the case of spoofing attacks, faces typically show more rigid motion (Reference 18).
  c. Combinations of Still Images and Videos (Reference 12). 2. User behavior modeling (Reference 12).
3. User interaction need (Reference 12).
4. Additional devices (Reference 12).

The most effective non-intrusive mechanisms based solely on existing sensor technology seem to be based on a combination of Motion, Texture, and Liveness detection. See Reference 9.

Textural Differences

The impact on printing and re-scanning a picture may be detected. It is intuitively clear that the quality of an image doesn't improve by printing and re-scanning it. The research in Reference 15 shows that differences can be algorithmically detected by analyzing micro textures: "A close look at the differences between real faces and face prints reveals that human faces and prints reflect light in different ways because a human face is a complex non rigid 3D object whereas a photograph can be seen as a planar rigid object."

This algorithm has been tested against the images included in the NUAA Photograph Imposter Database. The performance has been reported to be at 16.5 ms in average to process an image on a 2.4 GHz Intel Core 2 Duo CPU with 3 GB of RAM using un-optimized C++ code.

Infrared Instead of Visual Light

It is difficult to display images or videos in infrared spectrum. As a result liveness detection based on capturing thermal patterns of faces as proposed in Reference 19 would be more robust than capturing patterns in visual light. Unfortunately infrared sensors are expensive and not included in typical notebooks, tablets or smart phones.

Optical Flow Based Methods

Real faces are 3 dimensional objects. Faces are typically moving in normal conversations. The 2D motion of the central face parts, i.e., the parts with less distance to the camera is expected to be higher compared to the 2D motion of face regions with greater distance from the camera (References 20, 21, 22). For this type of detection a sequence of at least 3 consecutive images is required.

The research in Reference 21 is part of the SART-2 project, a Biometric security system for mobile workstations.

Motion Pictures Instead of Still Images

In Reference 23, a blinking-based liveness detection method is described. This method seems to be pretty robust against simple photo based spoofing attacks. In addition to recognizing the face, the method locates the eyes and checks whether closing the eyes is visible in the observed image sequence. As seen from the Android 4.1 large scale trial, this method is obviously not very robust against "photoshop" attacks. See Reference 5.

In general, in order to spoof such motion picture based systems the attacker must generate a small image sequence and must present the sequence to the sensor. In a world with powerful image editors, free video editors, and tablet PCs this is relatively easy to achieve.

Such methods are characterized as "publicly known interactions," i.e., the attacker knows the required interactions in advance and can prepare a matching image sequence.

In Reference 23, the context of the scene and eye-blink is included in the analysis. Performance measured on Intel Core2 Duo 2.8 GHz, 2 GB RAM is approximately 50 ms per video frame (20 fps).

Challenge Response Methods

In the context of biometrics, a challenge response is defined as:

A method used to confirm the presence of a person by eliciting direct responses from the individual. Responses can be either voluntarily or involuntarily. In a voluntary response, the end user will consciously react to something that the system presents. In an involuntary response, the end user's body automatically responds to a stimulus. A challenge response can be used to protect the system against attacks.

(National Science & Technology Council's Subcommittee on Biometrics)

Multimodal Systems

Multimodal systems have been proposed to improve the robustness of biometric methods against spoofing attacks, noisy data etc. See Reference 25.

The effect of simulated spoofing attacks to such multimodal systems is analyzed in Reference 26. The main result is that not all fusion schemes improve the robustness against spoofing attacks, meaning that in some fusion schemes it is sufficient to spoof only a single biometric method in order to spoof the entire multimodal system. The analysis of existing schemes with real spoofing attacks lead to similar results. See Reference 27.

In general, there are three different classes of multimodal systems:
1) Systems where successfully spoofing a single trait is sufficient to spoof the entire system. Optimizing a multimodal system for small FRRs typically leads to such results.
2) Systems where:
    a) more than one trait has to be spoofed in order to successfully spoof the entire system; and
    b) spoofing any one trait in this multimodal system is no more complex than spoofing the same trait in a single modal system.
3) Systems where
    a) more than one trait has to be spoofed in order to successfully spoof the entire system; and
    b) spoofing any one trait in this multimodal system is more complex than spoofing the same trait in a single modal system. The embodiments of the invention described below fall into this category.

System and Method for Eye Tracking During Authentication

One embodiment of the invention performs eye-tracking as part of an authentication process to measure the response to varying regions of interest randomly arranged and displayed on the screen. For example, a sequence of random screen layouts mixing text, empty regions, images and video clips may be presented to the user to non-intrusively induce user's eye-movement. Concurrently, eye-tracking techniques are used to verify that the eyes are reacting to the screen layout in an expected manner. This information may then be combined with face recognition techniques to verify that the expected face is still present. Moreover, as discussed above, the eye tracking and facial recognition techniques may be combined with other techniques (e.g., location-based authentication, non-intrusive user presence detection, fingerprint scanning, etc) to arrive at a sufficient level of assurance that the legitimate user is in possession of the device.

Reading a Web page or other content type does not involve a smooth sweeping of the eyes along the contents, but a series of short stops (called "fixations") and quick "saccades". The resulting series of fixations and saccades is called a "scanpath". Scanpaths are useful for analyzing cognitive intent, interest, and salience (see current WikiPedia article for "Eye Tracking" at en.wikipedia.org/wiki/Eye_tracking). A "heatmap" is an aggregate representation showing what areas a group of people fixated when viewing a webpage or email (see Hartzell, "Crazy Egg Heatmap Shows Where People Click on Your Website" (Nov. 30, 2012), currently at www.michaelhartzell.com/Blog/bid/92970/Crazy-Egg-Heatmap-shows-where-people-click-on-your-website).

Figure 2:
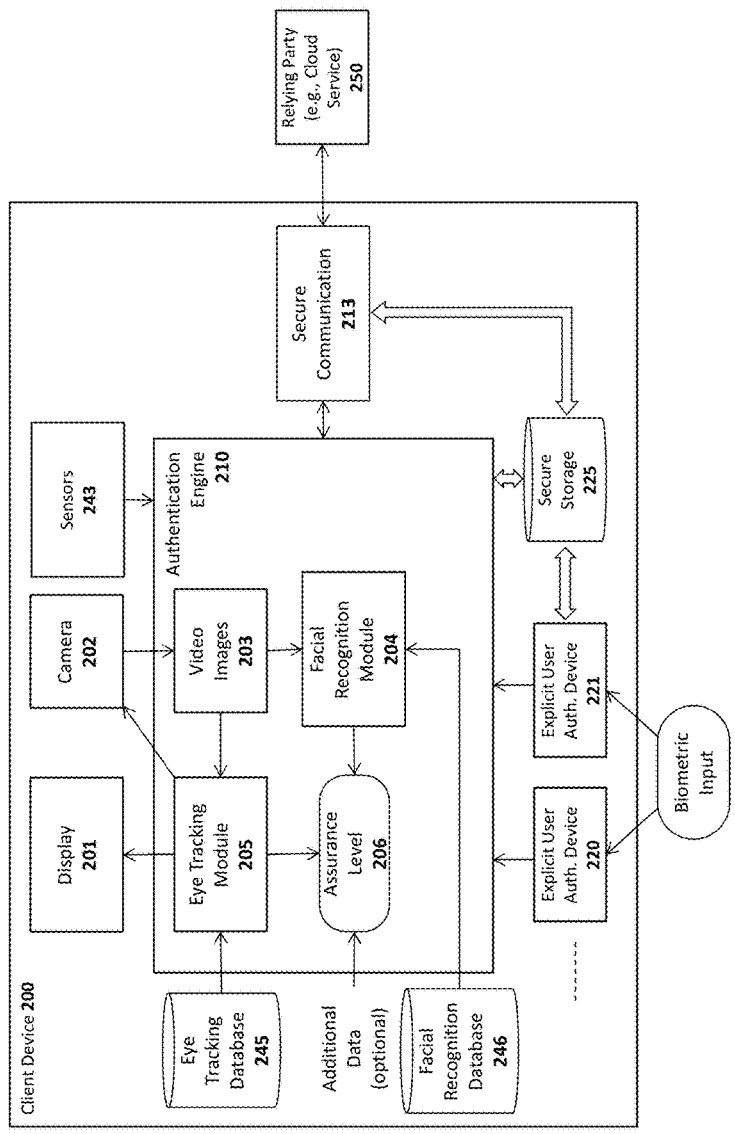
FIG. 2 illustrates one embodiment of an authentication engine including an eye tracking module and a facial recognition module.

As illustrated in FIG. 2, one embodiment of the invention comprises an authentication engine 210 on a client device 200 which includes a facial recognition module 204 for performing facial recognition and an eye tracking module 205 for performing the eye tracking operations described herein. In one embodiment, the facial recognition module 204 and eye tracking module 205 analyze sequences of video images 203 captured by a camera 202 on the device to perform their respective operations.

To perform its facial recognition operations, the facial recognition module 204 relies on facial recognition templates stored within a secure facial recognition database 246. In particular, as discussed above, matching logic within the facial recognition module 204 compares facial features extracted from the video images 203 with facial template data stored in the facial recognition database 246 and generates a "score" based on the similarity between the extracted features and the facial template data. As previously discussed, the facial template data stored in the database 246 may be generated by an enrollment process in which the user enrolls a facial image or other biometric data with the device 200. The score generated by the facial recognition module 204 may then be combined with scores from other authentication modules (e.g., such as eye tracking module 205 discussed below) to form an assurance level 206, representing the assurance that the legitimate user is initiating the current transaction. In one embodiment, each score must reach a particular threshold value to generate a sufficient assurance level 206 for a particular transaction. In one embodiment (assuming the thresholds are reached), the scores may be added together or combined using other mathematical formulae (e.g., the scores may be weighted, averaged, added together, or combined in any other way).

Figure 4A:
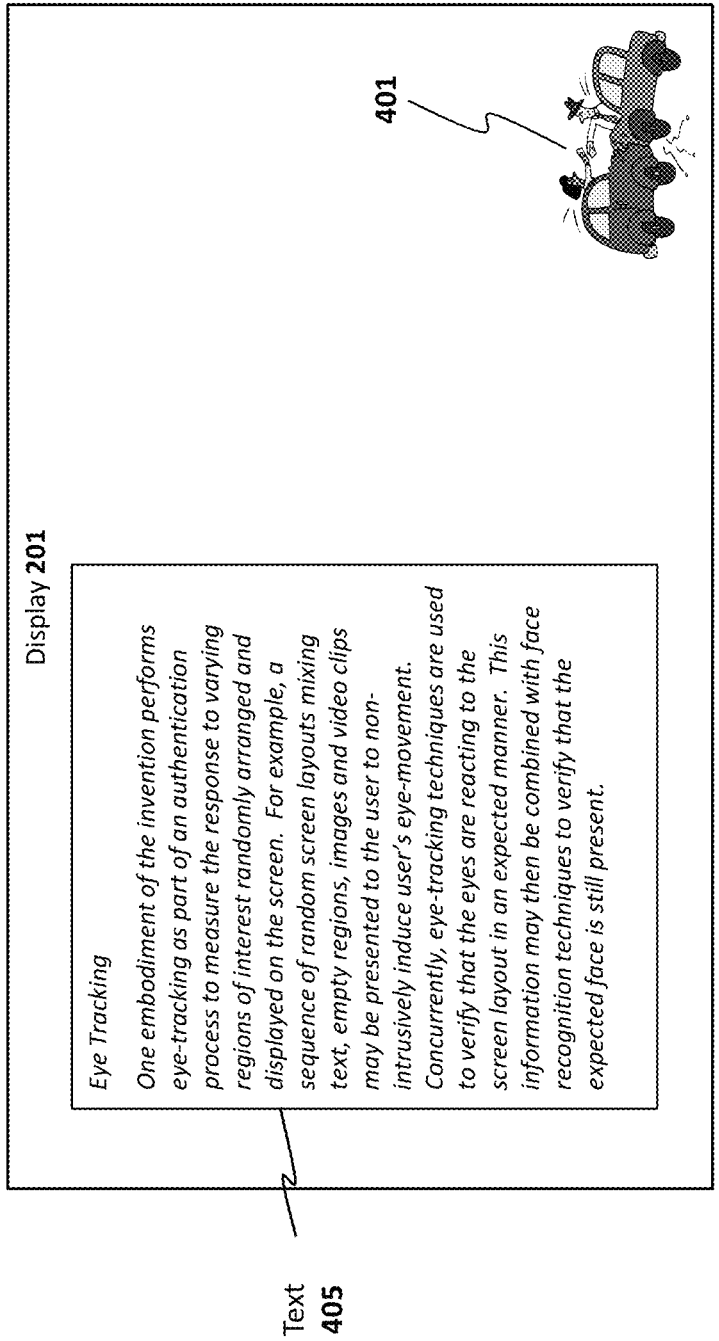
FIGS. 4A-B illustrate exemplary text, graphics, photos, videos, blank regions and other content which may be displayed to an end user.
Figure 4B:
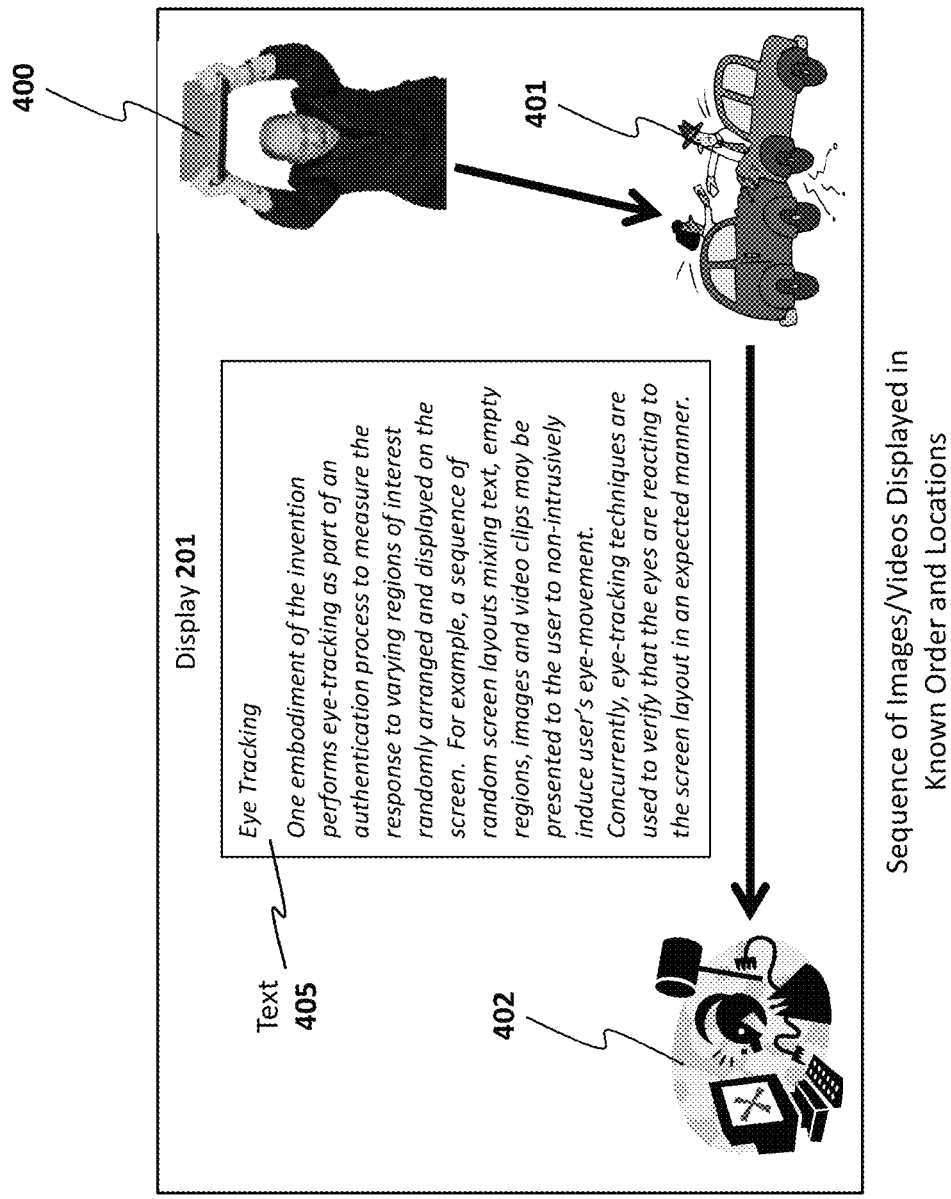

To perform eye tracking analysis, the eye tracking module 205 relies on eye tracking templates stored within a secure eye tracking database 245. Although illustrated as a separate database, the eye tracking database and facial recognition database may actually be the same secure database. In one embodiment, an eye tracking template specifies the text, graphics, pictures, videos and/or blank regions which are to be displayed for the user on the client device's display 201 (some examples of which are shown in FIGS. 4A-B below) and potentially the order in which the content is to be displayed. In addition, the eye tracking template includes data specifying the expected motion characteristic of a user's eyes in response to the content displayed to the user (e.g. in form of a heatmap, see below). Matching logic within the eye tracking module 205 compares the expected motion of the user's eyes with the actual motion (captured from the video images) to arrive at a "score" based on the similarity between the expected motion and the actual motion. As mentioned, the score may then be combined with scores from other authentication modules (e.g., such as facial recognition module 204) to form an assurance level 206. The eye tracking template data stored in the database 246 may be compiled using recorded eye movements of other users and/or of the actual user of the device in response to each displayed Web page or other displayed image. For example, as with the facial recognition template, the eye tracking template may be generated as part of an enrollment process in which the user enrolls his/her eye motion with the device 200.

In one embodiment, the eye tracking module 205 determines the correlation between the images being displayed (which may include text, graphics, video, pictures, and/or blank regions) and the user's eye movement. For example, if a motion video is displayed in the lower right corner of the display, the vast majority of users will direct their attention to this region. Thus, if the eye tracking module 205 detects that the user's eyes have moved to this region within a designated period of time (e.g., 2 seconds), then it will detect a high correlation between the user's eyes and the template, resulting in a relatively high score. In contrast, if the user's eyes do not move to this region (or do not move at all), then the eye tracking module 205 will detect a low correlation and corresponding low score.

As illustrated in FIG. 2, various other explicit user authentication devices 220-221 and sensors 243 may be configured on the client device 200. These authentication devices and sensors may provide additional authentication data (if necessary) to be used by the authentication engine 210 when generating the assurance level 206 (i.e., in addition to the eye tracking and facial recognition described herein). For example, the sensors may include location sensors (e.g., GPS) to determine the location of the client device 200. If the client device is in an expected location, then the authentication engine may use this data to increase the assurance level 206. By contrast, if the client device is in an unusual location (e.g., another country), then this may negatively impact the assurance level 206. In this manner, authentication data may be generated non-intrusively (i.e., using sensor data collected without explicit input from the end user).

In addition, another non-intrusive technique involves the authentication engine 210 monitoring the time which has passed since the last explicit user authentication. For example, if the user has authenticated using a fingerprint or other biometric device 220-221 or has entered a password recently (e.g., within 10 minutes), then it will use this information to increase the assurance level 206. By contrast, if the user has not explicitly authenticated for several days, then it may require more rigorous authentication by the facial recognition module 205 and eye tracking module 205 (e.g., it may require a higher correlation with the template data than usual to increase the assurance level to an acceptable value for the current transaction).

In one embodiment, secure storage 225 is a secure storage device provided for storing the authentication keys associated with each of the authenticators and used by the secure communication module 213 to establish secure communication with the relying party (e.g., a cloud service 250 or other type of network service).

An exemplary "heatmap" generated for a Web page is illustrated in FIG. 3. The color coding represents the regions of the Web page on which users fixed their eyes while viewing. Red indicates the highest amount of fixation (meaning that users tended to view these regions more frequently), followed by yellow (indicating less fixation), blue (indicating still less fixation), and then no color (indicating no fixation or fixation below a threshold amount).

When designing web pages, eye tracking and heatmap analysis is performed as part of the usability analysis. Research (see, e.g., References 29, 30) has shown that Web users spend 80% of their time looking at information above the page fold. Although users do scroll, they allocate only 20% of their attention below the fold. Web users spend 69% of their time viewing the left half of the page and 30% viewing the right half. A conventional layout is thus more likely to make sites profitable.

Spoofing attacks like presenting a still face image or a video displayed on a monitor can be detected by the eye tracking module 205 as the scanpath would most probably not correlate to the screen layout. Different types of Eye-Tracking methods are available: specialized equipment with high accuracy and software based methods using standard web cams (see Reference 33).

FIG. 4A illustrates an exemplary grouping of text 405 and an image and/or video 401 displayed on the client device display 201. In one embodiment, the grouping is integrated into a Web page. However, the underlying principles of the invention are not limited to a Web-based organization. The grouping could also be part of a Screen Saver or other applications. In one embodiment, the text 405 and image/video 401 are displayed concurrently. In another embodiment, the text is displayed first, followed by the image/video 401. In either case, the expectation is that the user's eyes would be directed to the lower right corner of the display 201 (where the image/video 401 is displayed).

FIG. 4B illustrates another example which includes a text region 405 and three image/video elements 400-402. In one embodiment, the image/video element 400 is displayed first, followed by image/video element 401, followed by image/video element 402. In such a case, the user's eyes should move from the upper right corner of the display, to the lower right, and then to the lower left.

In one embodiment, the particular image/video elements 400-402 and other content types are randomly selected by the eye tracking module 205, thereby making it harder to anticipate and spoof. In addition, the particular location in which the different image/video elements 400-402 are selected randomly. In such a case, the eye motion template may specify a particular mode of operation for displaying content, but will not specify the actual content o the actual location(s). Rather, the content and the locations are selected by the eye tracking module 205 which will then assume that the user's eyes should gravitate towards the content being displayed and generate a correlation and score based on the extent to which this is detected.

In addition, rather than generating its own content, the eye tracking module 205 may use existing content such as an existing Web page of the relying party 250 or images stored locally on the device. For example, if the relying party is a financial institution and the user is attempting to enter into a financial transaction, then the Web page normally displayed during the transaction may be displayed. In such a case, the eye tracking module 205 may retrieve a heatmap for the Web page (such as shown in FIG. 3) from the eye tracking database 245 and determine whether a correlation exists to the heatmap and the locations being viewed by the end user.

In summary, the embodiments described herein may present a sequence of random screen layouts mixing text, empty regions, images and video clips and continuously track the user's eyes producing the captured scanpath. A correlation is then made between the captured scanpath and the expected scanpath. In addition, one embodiment of the invention may then re-verify that the face is still recognized.

Not all people are equally attracted by the same images or image sequences. For example some people are attracted by technology more than they are by animals, text, known or unknown human faces or bodies, mystic symbols, or even mathematical formulas. With this in mind, one embodiment of the eye tracking module 205 learns the person specific characteristics of eye-movement triggered by different types of images. The degree of similarity of the measured characteristic from the video images 203 and the reference data (stored in the eye tracking database 245) is then used to generate the assurance level 206 (i.e., the certainty that the legitimate user's eyes are following "challenge" images, video, and other content displayed on the display 201).

A method in accordance with one embodiment of the invention is illustrated in FIG. 5. The method may be implemented within a system architecture such as shown in FIG. 2, but is not limited to any particular system architecture.

At 501 a particular eye tracking template is selected for the given user and/or transaction and, at 502 a sequence of images of the user's face are captured while displaying content according to the template. For example, the template may specify the types of content, the location of the content, and the timing for displaying the content. Alternatively, the template may only generally specify a type of eye-tracking and the eye tracking module 205 may determine how, where and when to display the content.

Regardless of how the content is selected and displayed, at 503, facial recognition is performed and, at 504, eye tracking analysis is performed using the captured sequence of images. At 505 a facial assurance level is generated based on the correlation between the captured images and the facial templates. Similarly, at 506, an eye tracking assurance level is generated based on the correlation between the motion of the user's eyes and the expected motion of the user's eyes.

Although illustrated in FIG. 5 as parallel operations 503/505 and 504/506, the facial recognition operations 503/505 may be performed first and the eye tracking operations 504/506 may then be performed only if the facial recognition operations result in a high correlation/assurance level (or vice-versa).

At 507, a determination is made as to whether the combined results of the facial authentication and eye tracking is sufficient to allow the current transaction to proceed. If so, then the transaction is permitted at 509. If not, then at 508, the transaction is disallowed or additional authentication techniques are requested to raise the level of assurance. For example, at this stage, the user may be asked to swipe a finger on a fingerprint sensor or to enter a PIN associated with the user's account. If the additional authentication techniques are sufficient, determined at 510, then the transaction is permitted at 509.

Exemplary System Architectures

Figure 6A:
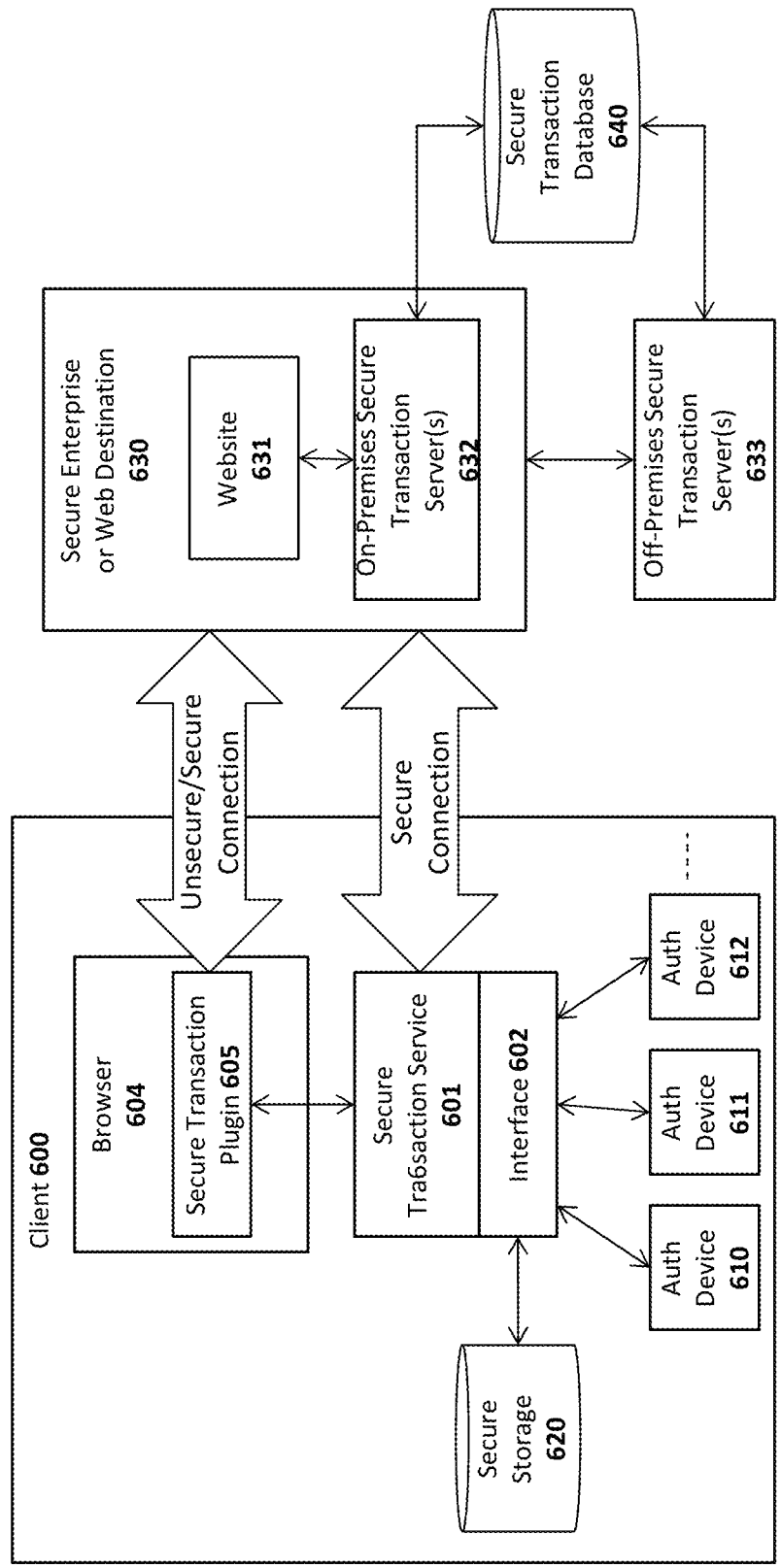
FIGS. 6A-B illustrate different architectural arrangements within which embodiments of the invention may be implemented.
Figure 6B:
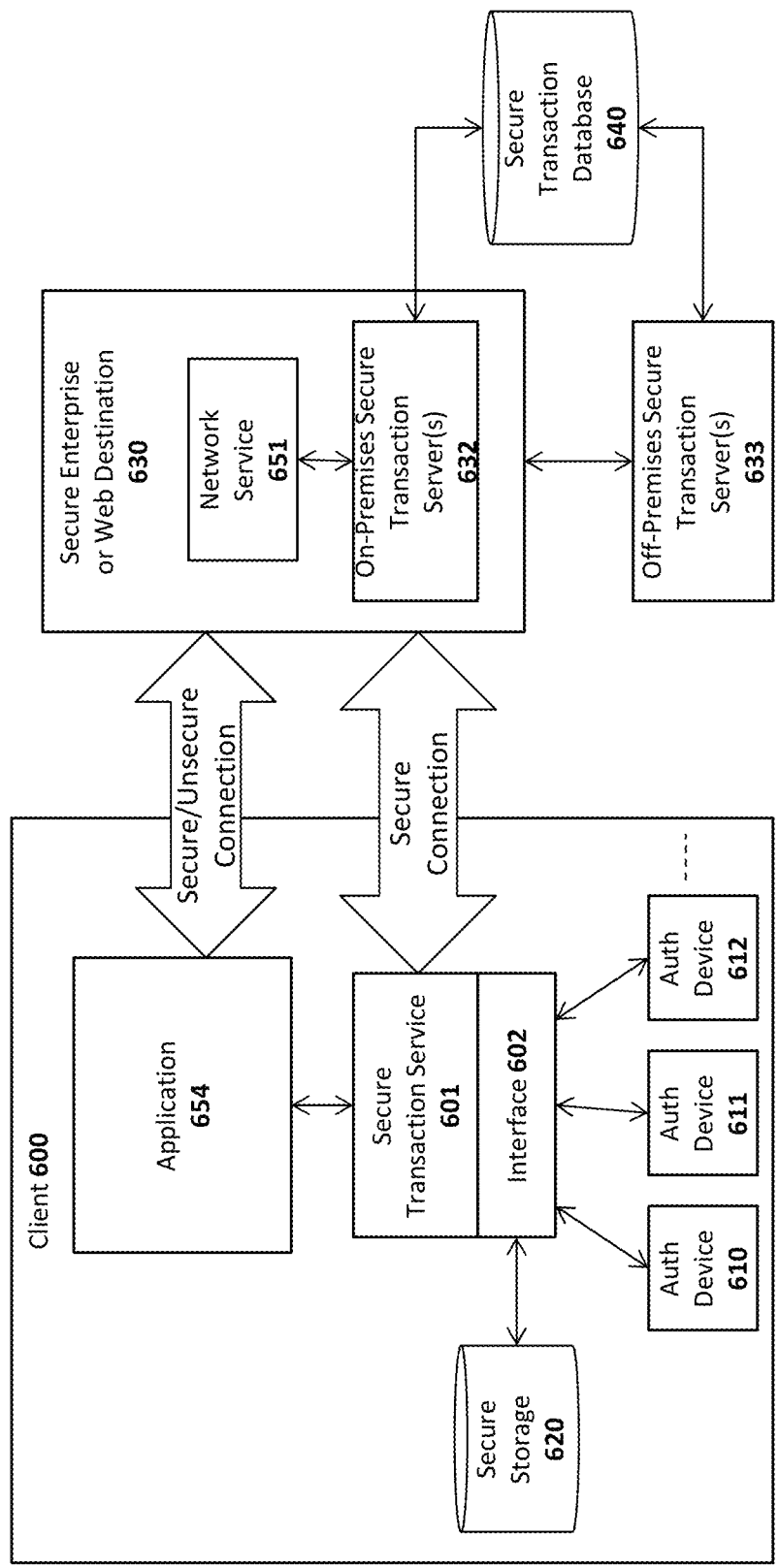

FIGS. 6A-B illustrate two embodiments of a system architecture comprising client-side and server-side components for authenticating a user. The embodiment shown in FIG. 6A uses a browser plugin-based architecture for communicating with a website while the embodiment shown in FIG. 6B does not require a browser. The various techniques described herein for eye-tracking authentication and facial recognition authentication may be implemented on either of these system architectures. For example, the authentication engine 210 shown in FIG. 2 may be implemented as part of the secure transaction service 601 (including interface 602) and/or the secure transaction plugin 605 or application 652. It should be noted, however, that the embodiment illustrated in FIG. 2 stands on its own and may be implemented using logical arrangements of hardware and software other than those shown in FIGS. 6A-B.

While the secure storage 620 is illustrated outside of the secure perimeter of the authentication device(s) 610-612, in one embodiment, each authentication device 610-612 may have its own integrated secure storage. Alternatively, each authentication device 610-612 may cryptographically protect the biometric reference data records (e.g., wrapping them using a symmetric key to make the storage 620 secure).

Turning to FIG. 6A, the illustrated embodiment includes a client 600 equipped with one or more authentication devices 610-612 for enrolling and authenticating an end user. As mentioned above, the authentication devices 610-612 may include biometric devices such as fingerprint sensors, voice recognition hardware/software (e.g., a microphone and associated software for recognizing a speaker), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards.

The authentication devices 610-612 are communicatively coupled to the client through an interface 602 (e.g., an application programming interface or API) exposed by a secure transaction service 601. The secure transaction service 601 is a secure application for communicating with one or more secure transaction servers 632-633 over a network and for interfacing with a secure transaction plugin 605 executed within the context of a web browser 604. As illustrated, the Interface 602 may also provide secure access to a secure storage device 620 on the client 600 which stores information related to each of the authentication devices 610-612 such as a device identification code, user identification code, user enrollment data (e.g., scanned fingerprint or other biometric data), and keys used to perform the secure authentication techniques described herein. For example, as discussed in detail below, a unique key may be stored into each of the authentication devices and used when communicating to servers 630 over a network such as the Internet.

As discussed below, certain types of network transactions are supported by the secure transaction plugin 605 such as HTTP or HTTPS transactions with websites 631 or other servers. In one embodiment, the secure transaction plugin is initiated in response to specific HTML tags inserted into the HTML code of a web page by the web server 631 within the secure enterprise or Web destination 630 (sometimes simply referred to below as "server 630"). In response to detecting such a tag, the secure transaction plugin 605 may forward transactions to the secure transaction service 601 for processing. In addition, for certain types of transactions (e.g., such as secure key exchange) the secure transaction service 601 may open a direct communication channel with the on-premises transaction server 632 (i.e., co-located with the website) or with an off-premises transaction server 633.

The secure transaction servers 632-633 are coupled to a secure transaction database 640 for storing user data, authentication device data, keys and other secure information needed to support the secure authentication transactions described below. It should be noted, however, that the underlying principles of the invention do not require the separation of logical components within the secure enterprise or web destination 630 shown in FIG. 6A. For example, the website 631 and the secure transaction servers 632-633 may be implemented within a single physical server or separate physical servers. Moreover, the website 631 and transaction servers 632-633 may be implemented within an integrated software module executed on one or more servers for performing the functions described below.

As mentioned above, the underlying principles of the invention are not limited to a browser-based architecture shown in FIG. 6A. FIG. 6B illustrates an alternate implementation in which a stand-alone application 654 utilizes the functionality provided by the secure transaction service 601 to authenticate a user over a network. In one embodiment, the application 654 is designed to establish communication sessions with one or more network services 651 which rely on the secure transaction servers 632-633 for performing the user/client authentication techniques described in detail below.

In either of the embodiments shown in FIGS. 6A-B, the secure transaction servers 632-633 may generate the keys which are then securely transmitted to the secure transaction service 601 and stored into the authentication devices within the secure storage 620. Alternatively, the secure transaction service 601 might generate the keys which are then securely transmitted to the transaction servers 632-633. Additionally, the secure transaction servers 632-633 manage the secure transaction database 640 on the server side.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

REFERENCES

1. Biometrics: Uses and Abuses. Schneier, B. 1999. Inside Risks 110 (CACM 42, 8, August 1999). http://www.schneier.com/essay-019.pdf.
2. Zhao, W., et al., et al. Face Recognition: A Literature Survey. ACM Computing Surveys, Vol. 35, No. 4. December 2003, pp. 399-458.
3. Andrea F. Abate, Michele Nappi, Daniel Riccio, Gabriele Sabatino. 2D and 3D face recognition: A survey. Pattern Recognition Letters. 2007, 28, pp. 1885-1906.
4. GSM Arena. GSM Arena. [Online] Nov. 13, 2011. [Cited: SDeptember 29, 2012.] http://www.gsmarena.com/ ice_cream_sandwichs_face_unlock_duped_using_a_photograph-news-3377.php.
5. James. Print Screen Mac. [Online] Aug. 6, 2012. [Cited: Sep. 28, 2012.] http://printscreenmac.info/how-to-trick-android-jelly-bean-face-unlock/.
6. P. JONATHON PHILLIPS, PATRICK GROTHER, ROSS J. MICHEALS, DUANE M. BLACKBURN, ELHAM TABASSI, MIKE BONE. FACE RECOGNITION VENDOR TEST 2002: Evaluation Report. s.I.: NIST, 2002 http://www.face-rec.org/vendors/FRVT_2002_Evaluation_Report.pdf.
7. P. Jonathon Phillips, W. Todd Scruggs, Alice J. O'Toole, Patrick J. Flynn, Kevin W. Bowyer, Cathy L. Schott, Matthew Sharpe. FRVT 2006 and ICE 2006 Large-Scale Results, NIST IR 7408. Gaithersburg: NIST, 2006.
8. Patrick J. Grother, George W. Quinn and P. Jonathon Philips, NIST. Report on the Evaluation of 2D Still-Image Face Recognition Algorithms, NIST IR 7709. s.I.: NIST, 2011.
9. Murali Mohan Chakka, André Anjos, Sébastien Marcel, Roberto Tronci, Daniele Muntoni, Gianluca Fadda, Maurizio Pili, Nicola Sirena, Gabriele Murgia, Marco Ristori, Fabio Roli, Junjie Yan, Dong Yi, Zhen Lei, Zhiwei Zhang, Stan Z. Li, et. al. Competition on Counter Measures to 2-D Facial Spoofing Attacks. 2011. http://www.csis.pace.edu/~ctappert/dps/IJCB2011/papers/130.pdf. 978-1-4577-1359-0/11.
10. Nalini K. Ratha, Jonathan H. Connell, and Ruud M. Bolle, IBM Thomas J. Watson Research Center. An Analysis of Minutiae Matching Strength. Hawthorne, N.Y. 10532: IBM. http://pdf.aminer.org/000/060/741/an_analysis_of_minutiae_matching_strength.pdf.
11. Roberts, Chris. Biometric Attack Vectors and Defences. 2006. http://otago.ourarchive.ac.nz/bitstream/handle/10523/1243/BiometricAttackVectors.pdf.
12. Video-Based Face Spoofing Detection through Visual Rhythm Analysis. Allan da Silva Pinto, Helio Pedrini, William Robson Schwartz, Anderson Rocha. Los Alamitos: IEEE Computer Society Conference Publishing Services, 2012. Conference on Graphics, Patterns and Images, 25. (SIBGRAPI). http://sibgrapi.sid.inpe.br/rep/sid.inpe.br/sibgrapi/2012/07.13.21.16?mirror=sid.inpe.br/banon/2001/03.30.15.38.24&metadatarepository=sid.inpe.br/sibgrapi/2012/07.13.21.16.53.
13. Jiangwei Li, Yunhong Wang, Tieniu Tan, A. K. Jain. Live Face Detection Based on the Analysis of Fourier Spectra. Biometric Technology for Human Identification. 2004, pp. 296-303.
14. Xiaoyang Tan, Yi Li, Jun Liu and Lin Jiang. Face Liveness Detection from A Single Image with Sparse Low Rank Bilinear Discriminative Model. s.I.: European Conference on Computer Vision, 2010. pp. 504-517.
15. Jukka Määtta, Abdenour Hadid, Matti Pietikäinen, Machine Vision Group, University of Oulu, Finland. Face Spoofing Detection From Single Images Using Micro-Texture Analysis. Oulu, Finland: IEEE, 2011. http://www.ee.oulu.fi/research/mvmp/mvg/files/pdf/131.pdf.
16. R. Tronci, D. Muntoni, G. Fadda, M. Pili, N. Sirena, G. Murgia, M. Ristori, and F. Roli. Fusion of Multiple Clues for Photo-Attack Detection in Face Recognition Systems. s.I.: Intl. Joint Conference on Biometrics, 2011. pp. 1-6.
17. Pietikäinen, Marko Heikkilä and Matti. A Texture-Based Method for Modeling the Background and Detecting Moving Objects. Oulu: IEEE, 2005. http://www.ee.oulu.fi/mvg/files/pdf/pdf_662.pdf.
18. Yigang Peng, Arvind Ganesh, John Wright and Yi Ma. RASL: Robust Alignment by Sparse and Low-rank Decomposition for Linearly Correlated Images. IEEE Conference on Computer Vision and Pattern Recognition. 2010, pp. 763-770. http://yima.csl.illinois.edu/psfile/RASL_CVPR10.pdf.
19. S. Kong, J. Heo, B. Abidi, J. Paik, and M. Abidi. Recent advances in visual and infrared face recognition—a review. Journal of Computer Vision and Image Understanding. June 2005, Vol. 1, 97, pp. 103-135.
20. K. Kollreider, H. Fronthaler and J. Bigun, Halmstad University, SE-30118, Sweden. Evaluating Liveness by Face Images and the Structure Tensor. Halmstad, Sweden: s.n., 2005. http://citeseerx.ist.psu.edu/viewdoc/download?doi=10.1.1.62.6534&rep=rep1&type=pdf.
21. Maciej Smiatacz, Gdansk University of Technology. LIVENESS MEASUREMENTS USING OPTICAL FLOW FOR BIOMETRIC PERSON AUTHENTICATION. Metrology and Measurement Systems. 2012, Vol. XIX, 2.
22. Bao, Wei, et al., et al. A liveness detection method for face recognition based on optical flow field. Image Analysis and Signal Processing, IASP 2009. Apr. 11.-12., 2009, pp. 233-236. http://ieeexplore.ieee.org/stamp/stamp.jsp?tp=&arnumber=5054589&isnumber=5054562.
23. Gang Pan, Zhaohui Wu and Lin Sun. Liveness Detection for Face Recognition. [book auth.] Mislay Grgic and Marian Stewart Bartlett Kresimir Delac. Recent Advances in Face Recognition. Vienna: I-Tech, 2008, p. 236 ff.
24. National Science & Technology Council's Subcommittee on Biometrics. Biometrics Glossary. NSTC. http://www.biometrics.gov/documents/glossary.pdf.
25. Jain, Arun Ross and Anil K. Multimodal Biometrics: An Overview. Proceedings of 12th European Signal Processing Conference (EUSIPCO). September 2004, pp. 1221-1224. http://www.csee.wvu.edu/~ross/pubs/RossMultimodalOverview_EUSIPCO04.pdf.
26. R. N. Rodrigues, et al. Robustness of multimodal biometric fusion methods against spoof attacks. Journal of Visual Language and Computing. 2009. http://cubs.buffalo.edu/govind/papers/visual09.pdf.
27. Spoof Attacks on Multimodal Biometric Systems. Zahid Akhtar, Sandeep Kale, Nasir Alfarid. Singapore: IACSIT Press, Singapore, 2011. 2011 International Conference on Information and Network Technology IPCSIT. Vol. 4. http://www.ipcsit.com/vol4/9-ICINT2011T046.pdf.
28. EyeTools. Part III: What is a heatmap . . . really? [Online] [Cited: Nov. 1, 2012.] http://eyetools.com/articles/p3-understanding-eye-tracking-what-is-a-heatmap-really.
29. Nielsen, Jakob. useit.com. Jakob Nielsen's Alertbox—Scrolling and Attention. [Online] Mar. 22, 2010. [Cited: Nov. 1, 2012.] http://www.useit.com/alertbox/scrolling-attention.html.
30. Nielsen, Jakib. useit.com. Jakob Nielsen's Alertbox—Horizontal Attention Leans Left. [Online] Apr. 6, 2010. [Cited: Nov. 1, 2012.] http://www.useit.com/alertbox/horizontal-attention.html.
31. Gus Lubin, Kim Bhasin and Shlomo Sprung. Business Insider. 16 Heatmaps That Reveal Exactly Where People Look. [Online] May 21, 2012. [Cited: Nov. 1, 2012.] http://www.businessindercom/eye-tracking-heatmaps-2012-5?op=1.
32. Lin-Shung Huang, Alex Moshchuk, Helen J. Wang, Stuart Schechter, Collin Jackson. Clickjacking: Attacks and Defenses. s.I.: Usenix Security 2012, 2012. https://www.usenix.org/system/files/conference/usenixsecurity12/sec12-final39.pdf.
33. Willis, Nathan. Linux.com. Weekend Project: Take a Tour of Open Source Eye-Tracking Software. [Online] Mar. 2, 2012. [Cited: Nov. 1, 2012.] https://www.linux.com/learn/tutorials/550880-weekend-project-take-a-tour-of-open-source-eye-tracking-software.
34. Girija Chetty, School of ISE, University of Can berra, Australia. Multilevel liveness verification for face-voice biometric authentication. BYSM-2006 Symposium. Baltimore: s.n., Sep. 19, 2006. http://www.biometrics.org/bc2006/presentations/Tues_Sep_19/BSYM/19_Chetty_research.pdf.
35. P. A. Tresadern, C. McCool, N. Poh, P. Matejka, A. Hadid, C. Levy, T. F. Cootes and S. Marcel. Mobile Biometrics (MoBio): Joint Face and Voice Verification for a Mobile Platform. 2012. http://personal.ee.surrey.ac.uk/Personal/Norman.Poh/data/tresadern_PervComp2012_draft.pdf.
36. Arabnia, Rabia Jafri and Hamid R. A Survey of Face Recognition Techniques. Journal of Information Processing Systems, Vol. 5, No. 2, June 2009. June 2009, Vol. 5, 2, pp. 41-68. http://www.cosy.sbg.ac.at/~uhl/face_recognition.pdf.
37. Himanshu, Sanjeev Dhawan, Neha Khurana. A REVIEW OF FACE RECOGNITION. International Journal of Research in Engineering & Applied Sciences. February 2012, Vol. 2, 2, pp. 835-846. http://euroasiapub.org/IJREAS/Feb2012/81.pdf.
38. BIOMETRIC IMAGE PROCESSING AND RECOGNITION. P. Jonathon Phillips, R. Michael McCabe, and Rama Chellappa. 1998. Eusipco.
39. Chellappa, Shaohua Kevin Zhou and Rama;. Face Recognition from Still Images and Videos. University of Maryland, College Park, Md. 20742. Maryland: s.n., 2004. http://citeseerx.ist.psu.edu/viewdoc/download?doi=10.1.1.77.1312&rep=rep1&type=pdf.
40. George W. Quinn, Patrick J. Grother, NIST. Performance of Face Recognition Algorithms on Compressed Images, NIST Inter Agency Report 7830. s.I.: NIST, 2011.
41. The Extended M2VTS Database. [Online] [Cited: Sep. 29, 2012.] http://www.ee.surrey.ac.uk/CVSSP/xm2vtsdb/.
42. N. K. Ratha, J. H. Connell, R. M. Bolle, IBM. Enhancing security and privacy in biometrics-based authentication systems. IBM Systems Journal. 2001, Vol. 40, 3.
43. Schuckers, Stephanie A. C. Spoofing and Anti-Spoofing Measures. Information Security Technical Report. 2002, Vol. 7, 4.
44. William Robson Schwartz, Anderson Rocha, Helio Pedrini. Face Spoofing Detection through Partial Least Squares and Low-Level Descriptors. s.I.: Intl. Joint Conference on Biometrics, 2011. pp. 1-8.
45. Edited by Kresimir Delac, Mislay Grgic and Marian Stewart Bartlett. s.I.: InTech, 2008. http://cdn.intechopen.com/finals/81/InTech-Recent_advances_inface_recognition.zip. ISBN 978-953-7619-34-3.
46. Gang Pan, Lin Sun, ZhaohuiWu, YuemingWang. Monocular camera-based face liveness detection by combining eyeblink and scene context. s.I.: Springer Science+Business Media, LLC, 2010. http://www.cs.zju.edu.cn/~gpan/publication/2011-TeleSys-liveness.pdf.
47. Roberto Tronci, Daniele Muntoni, Gianluca Fadda, Maurizio Pili, Nicola Sirena, Gabriele Murgia, Marco Ristori, Fabio Roli. Fusion of multiple clues for photo-attack detection in face recognition systems. 09010 Pula (CA), Italy: s.n., 2011. http://prag.diee.unica.it/pra/system/files/Amilab_IJCB2011.pdf.
48. Anderson Rocha, Walter Scheirer, Terrance Boult, Siome Goldenstein. Vision of the Unseen: Current Trends and Challenges in Digital Image and Video Forensics. s.I.: ACM Computing Surveys, 2010. http://www.wjscheirer.com/papers/wjs_csur2011forensics.pdf.
49. Ernie Brickell, Intel Corporation; Jan Camenish, IBM Research; Liqun Chen, HP Laboratories. Direct Anonymous Attestation. 2004. http://eprint.iacr.org/2004/205.pdf.

I claim:

1. A method comprising:
receiving a request to authenticate a user;
presenting a plurality of screen layouts to the user;
capturing a sequence of images which include the user's eyes as the plurality of screen layouts are displayed;
(a) performing eye movement detection across the sequence of images to identify a correlation between motion of the user's eyes as the plurality of screen layouts are presented and an expected motion of the user's eyes as the plurality of screen layouts are presented and/or (b) measuring the user's eye pupil size across the sequence of images to identify a correlation between the effective light intensity of the plurality of screen layouts presented to the user and its effect on the user's eye pupil size;
performing facial recognition to identify a correlation between one or more images of the user's face and facial template data associated with the user; and
generating an assurance level based on the correlation between the images of the user's face and facial template data associated with the user, and the correlation between the motion of the user's eyes and an expected motion of the user's eyes as the plurality of screen layouts are presented and/or the correlation between the effective light intensity of the plurality of screen layouts presented to the user and its effect on the user's eye pupil size.

2. The method as in claim 1 wherein presenting the plurality of screen layouts comprises displaying one or more graphics images, photographs, or motion video images in designated regions of the display, wherein the expected motion characteristic of the user's eyes depends on the contents, the size, the appearance, the context and the region where these elements are shown.

3. The method as in claim 2 wherein facial recognition is performed first, resulting in a first correlation and eye movement detection is performed only if the facial recognition results in a correlation above a specified threshold.

4. The method as in claim 2 wherein the designated regions of the display for displaying the graphics images, photographs, or motion video images are selected randomly.

5. The method as in claim 2 wherein presenting the plurality of screen layouts comprises displaying a plurality of graphics images, photographs, or motion video images in a specified sequence using a specified timing.

6. The method as in claim 1 further comprising:
determining whether the assurance level is sufficient to authenticate the user for a particular transaction; and
permitting the transaction if the assurance level is sufficient.

7. The method as in claim 6 wherein the transaction is an online transaction with a remote relying party.

8. The method as in claim 6 further comprising:
if the assurance level is not sufficient by itself to authenticate the user for a particular transaction, then combining the assurance level with authentication data generated using one or more additional authentication techniques to authenticate the user for the particular transaction.

9. The method as in claim 8 wherein one of the additional authentication techniques comprises performing an explicit authentication in which the end user is required to enter a password or PIN or to swipe a finger on a fingerprint authentication device.

10. The method as in claim 8 wherein one of the additional authentication techniques comprises one or more non-intrusive authentication techniques in which sensor data collected from one or more device sensors is used for authentication.

11. The method as in claim 10 wherein the sensor data comprises location data.

12. The method as in claim 10 wherein one of the non-intrusive techniques comprises determining elapsed time from the last explicit user authentication and responsively increasing the assurance level of explicit user authentication has occurred within a specified time period.

13. The method as in claim 1 wherein the expected motion of the user's eyes is based on learned characteristics of eye-movement triggered by different types of images.

14. An apparatus comprising:
an authentication engine receiving a request to authenticate a user;
a camera capturing a sequence of images which include the user's eyes as a plurality of screen layouts are displayed;
an eye tracking hardware module (a) performing eye movement detection across the sequence of images to identify a correlation between motion of the user's eyes as the plurality of screen layouts are presented and an expected motion of the user's eyes as the plurality of screen layouts are presented and/or (b) measuring the user's eye pupil size across the sequence of images to identify a correlation between the effective light intensity of the plurality of screen layouts presented to the user and its effect on the user's eye pupil size;
a facial recognition device to perform facial recognition to identify a correlation between one or more images of the user's face and facial template data associated with the user; and
the authentication engine generating an assurance level based on the correlation between the images of the user's face and facial template data associated with the user, and the correlation between the motion of the user's eyes and an expected motion of the user's eyes as the plurality of screen layouts are presented and/or the correlation between the effective light intensity of the plurality of screen layouts presented to the user and its effect on the user's eye pupil size.

15. The apparatus as in claim 14 wherein presenting the plurality of screen layouts comprises displaying one or more graphics images, photographs, or motion video images in designated regions of the display, wherein the expected motion of the user's eyes is in the direction of the graphics images, photographs, or motion video images to different degrees.

16. The apparatus as in claim 15 wherein facial recognition is performed first, resulting in a first correlation and eye movement detection is performed only if the facial recognition results in a correlation above a specified threshold.

17. The apparatus as in claim 15 wherein the designated regions of the display for displaying the graphics images, photographs, or motion video images are selected randomly.

18. The apparatus as in claim 15 wherein presenting the plurality of screen layouts comprises displaying a plurality of graphics images, photographs, or motion video images in a specified sequence using a specified timing.

19. The apparatus as in claim 14 further comprising:
the authentication engine determining whether the assurance level is sufficient to authenticate the user for a particular transaction; and permitting the transaction if the assurance level is sufficient.

20. The apparatus as in claim 18 wherein the transaction is an online transaction with a remote relying party.

21. The apparatus as in claim 19 further comprising:
the authentication engine combining the assurance level with authentication data generated using one or more additional authentication techniques to authenticate the user for the particular transaction if the assurance level is not sufficient by itself to authenticate the user for a particular transaction.

22. The apparatus as in claim 19 wherein one of the additional authentication techniques comprises performing an explicit authentication in which the end user is required to enter a password or PIN or to swipe a finger on a fingerprint authentication device.

23. The apparatus as in claim 22 wherein one of the additional authentication techniques comprises one or more non-intrusive authentication techniques in which sensor data collected from one or more device sensors is used for authentication.

24. The apparatus as in claim 23 wherein the sensor data comprises location data.

25. The apparatus as in claim 23 wherein one of the non-intrusive techniques comprises determining elapsed time from the last explicit user authentication and responsively increasing the assurance level of explicit user authentication has occurred within a specified time period.

26. The apparatus as in claim 14 wherein the expected motion of the user's eyes is based on learned characteristics of eye-movement triggered by different types of images.

* * * * *